(12) United States Patent
Shimura

(10) Patent No.: US 10,873,768 B2
(45) Date of Patent: Dec. 22, 2020

(54) THREE-DIMENSIONAL ADVERTISING SPACE DETERMINATION SYSTEM, USER TERMINAL, AND THREE-DIMENSIONAL ADVERTISING SPACE DETERMINATION COMPUTER

(71) Applicant: DENTSU INC., Tokyo (JP)

(72) Inventor: Akihiro Shimura, Tokyo (JP)

(73) Assignee: DENTSU INC., Tokyo (JP)

( * ) Notice: Subject to any disclaimer, the term of this patent is extended or adjusted under 35 U.S.C. 154(b) by 398 days.

(21) Appl. No.: 15/821,335

(22) Filed: Nov. 22, 2017

(65) Prior Publication Data

US 2018/0084287 A1 Mar. 22, 2018

Related U.S. Application Data

(63) Continuation-in-part of application No. PCT/JP2016/058912, filed on Mar. 22, 2016.

(30) Foreign Application Priority Data

Jun. 2, 2015 (JP) ................................. 2015-112367

(51) Int. Cl.
*H04N 21/218* (2011.01)
*G06Q 30/02* (2012.01)
(Continued)

(52) U.S. Cl.
CPC ....... *H04N 21/21805* (2013.01); *G06F 3/013* (2013.01); *G06F 3/0484* (2013.01);
(Continued)

(58) Field of Classification Search
CPC .................................................. H04N 21/812
See application file for complete search history.

(56) References Cited

U.S. PATENT DOCUMENTS

2005/0021472 A1* 1/2005 Gettman ............... G06Q 30/02
705/52
2011/0292167 A1 12/2011 Altieri
(Continued)

FOREIGN PATENT DOCUMENTS

| JP | 2003-132362 A | 5/2003 |
|---|---|---|
| JP | 2014-41259 A | 3/2014 |
| JP | 2014-056466 | 3/2014 |

OTHER PUBLICATIONS

Extended European Search Report for corresponding European Application No. 16802880.1, dated Dec. 19, 2018.
(Continued)

*Primary Examiner* — Michael H Hong
(74) *Attorney, Agent, or Firm* — Jason H. Vick; Sheridan Ross, PC

(57) ABSTRACT

An effective advertising frame in a free viewpoint motion image is provided.
A distribution computer 51 distributes free viewpoint motion image data to each of user terminals 50AN1 to 50ANK. The user terminals 50AN1 to 50ANK create a motion image from the received free viewpoint motion image data and display the motion image. The user terminals 50AN1 to 50ANK extract history data of a focused region of the displayed image and transmit the history data to a stereoscopic advertising frame determination computer 52. The stereoscopic advertising frame determination computer 52 stores the history data for every user ID and every content ID and extracts a common region from focused regions of a plurality of users for each content ID to determine the region as a stereoscopic advertising frame.

15 Claims, 28 Drawing Sheets

(51) Int. Cl.

| | |
|---|---|
| H04N 21/43 | (2011.01) |
| G06T 19/00 | (2011.01) |
| G06F 3/0481 | (2013.01) |
| G06F 3/0484 | (2013.01) |
| G06F 3/01 | (2006.01) |
| H04N 13/194 | (2018.01) |
| H04N 21/234 | (2011.01) |
| H04N 21/435 | (2011.01) |
| H04N 21/472 | (2011.01) |
| H04N 21/81 | (2011.01) |

(52) U.S. Cl.
CPC ......... *G06F 3/04815* (2013.01); *G06Q 30/02* (2013.01); *G06T 19/00* (2013.01); *H04N 13/194* (2018.05); *H04N 21/23418* (2013.01); *H04N 21/23424* (2013.01); *H04N 21/43* (2013.01); *H04N 21/435* (2013.01); *H04N 21/47217* (2013.01); *H04N 21/812* (2013.01); *G06F 2203/04806* (2013.01)

(56) References Cited

U.S. PATENT DOCUMENTS

| | | |
|---|---|---|
| 2014/0059588 A1 | 2/2014 | Sakamoto et al. |
| 2014/0071131 A1 | 3/2014 | Kitago |

OTHER PUBLICATIONS

International Search Report for International Application No. PCT/JP2016/058912, dated Jun. 14, 2016.

International Preliminary Report on Patentability (Including Translation) for International Application No. PCT/JP2016/058912, dated Dec. 14, 2017.

\* cited by examiner

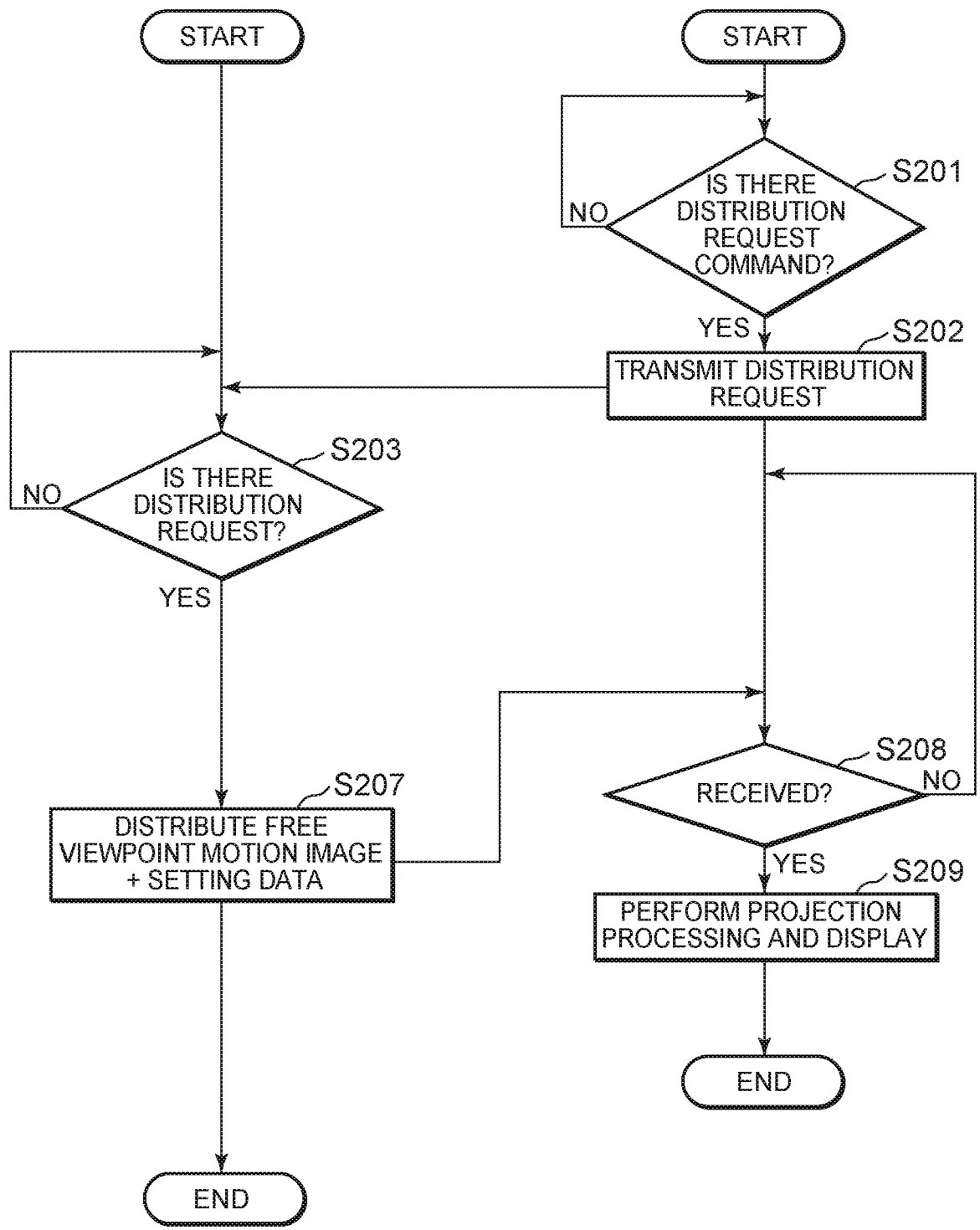

FIG. 8A BEGINNING

| TIME | VIEWPOINT | VIEWPOINT DIRECTION | ZOOMING |
|---|---|---|---|
|  | P1 | θ1、φ1 | — |

FIG. 8B ID0001

| ELAPSED TIME | VIEWPOINT | VIEWPOINT DIRECTION | ZOOMING |
|---|---|---|---|
| t0 | P1 | θ1、φ1 | — |
| t1 | P2 | θ1、φ1 | — |
| t2 | P3 | θ1、φ1 | — |
| t3 | P4 | θ1、φ1 | — |
| t4 | P5 | θ1、φ1 | — |

FIG. 8C ID0002

| ELAPSED TIME | VIEWPOINT | VIEWPOINT DIRECTION | ZOOMING |
|---|---|---|---|
| t0 | P1 | θ1、φ1 | — |
| t1 | P2 | θ2、φ2 | — |
| t2 | P3 | θ3、φ3 | — |
| t3 | P4 | θ4、φ4 | 2 |
| t4 | P5 | θ5、φ5 | 2 |

FIG. 8D ID0002

| ELAPSED TIME | VIEWPOINT | VIEWPOINT DIRECTION | ZOOMING |
|---|---|---|---|
| t0 | P1 | θ1、φ1 | — |
| t1 | P2 | θ2、φ2 | — |
| t2 | P3 | θ3、φ3 | 2 |
| t3 | P6 | θ6、φ6 | 2 |
| t4 | P7 | θ7、φ7 | 2 |

FIG.17

| INDIVIDUAL REGION \ TIME | ... | ... | t01 | ... | ... | ... |
|---|---|---|---|---|---|---|
| ⋮ | ⋮ | ⋮ | ⋮ | ⋮ | ⋮ | ⋮ |
| (B211,487,599) | ... | ... | 1 | ... | ... | ... |
| ⋮ | ⋮ | ⋮ | ⋮ | ⋮ | ⋮ | ⋮ |
| (B212,488,598) | ... | ... | 1 | ... | ... | ... |
| ⋮ | ⋮ | ⋮ | ⋮ | ⋮ | ⋮ | ⋮ |
| (B213,489,600) | ... | ... | 1 | ... | ... | ... |
| ⋮ | ⋮ | ⋮ | ⋮ | ⋮ | ⋮ | ⋮ |
| (B212,477,588) | ... | ... | 1 | ... | ... | ... |
| ⋮ | ⋮ | ⋮ | ⋮ | ⋮ | ⋮ | ⋮ |

FIG.18
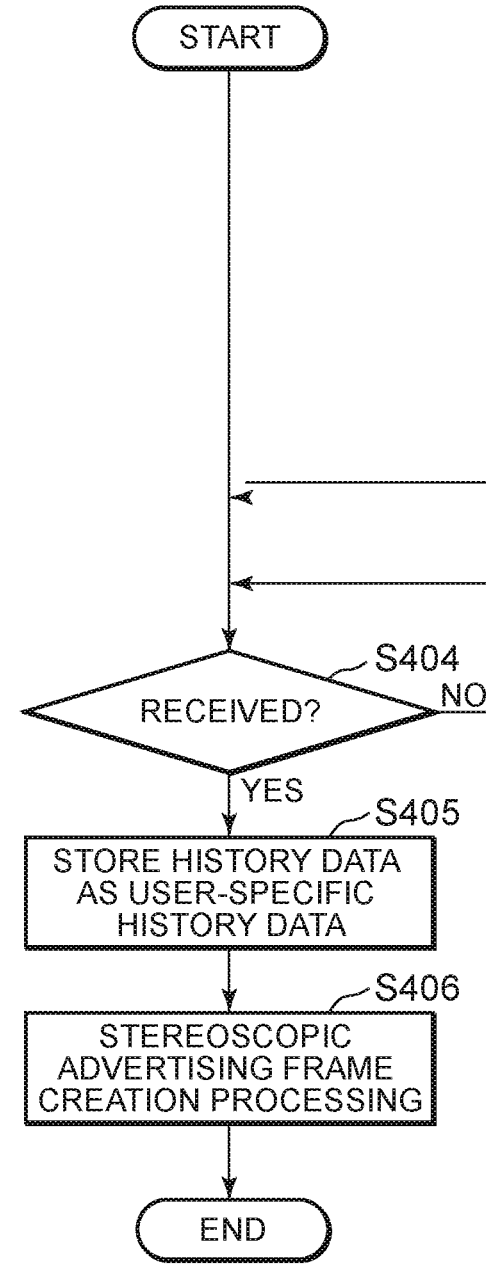
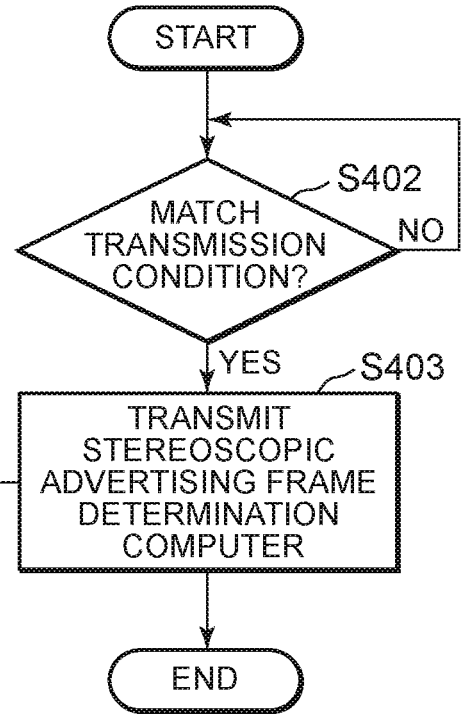

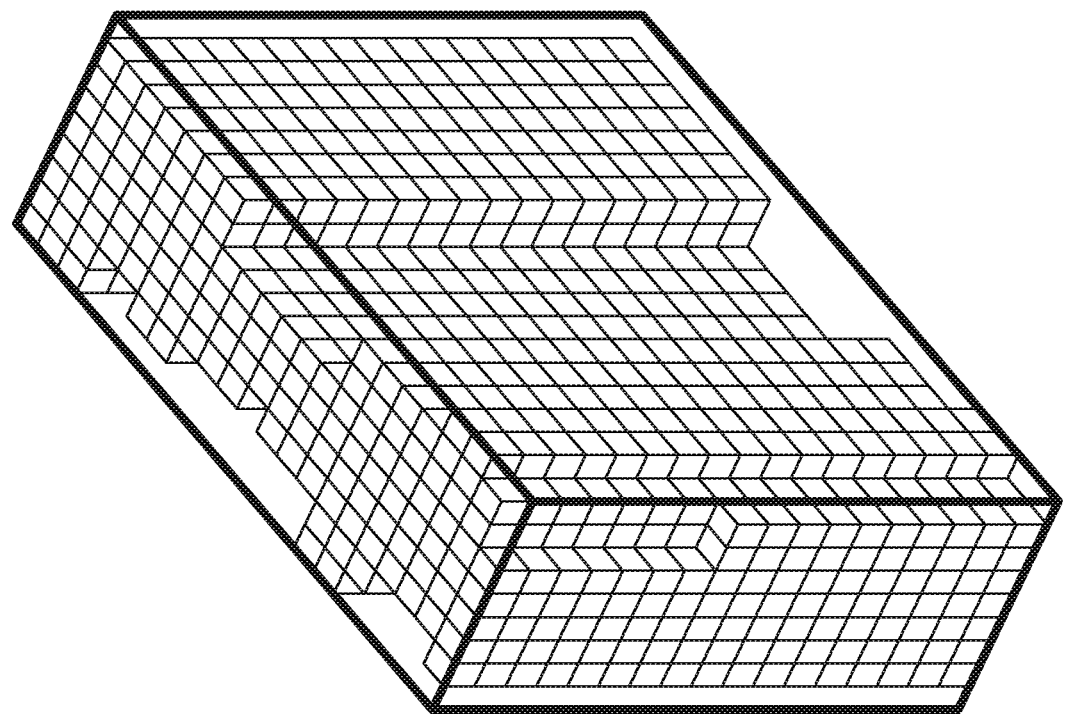
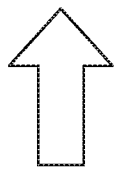
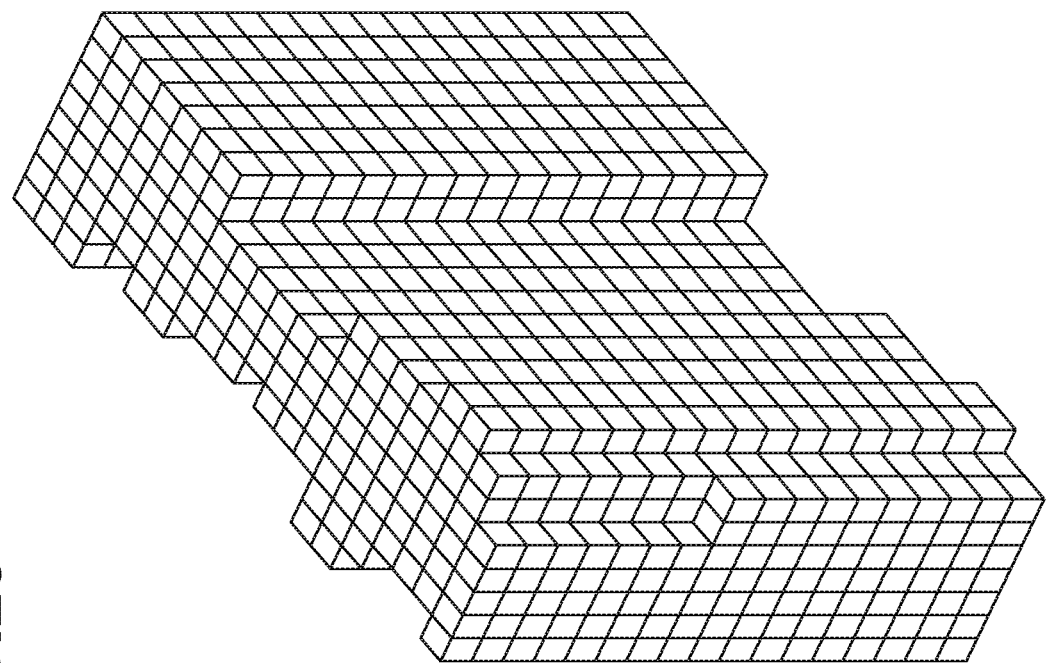
FIG. 25

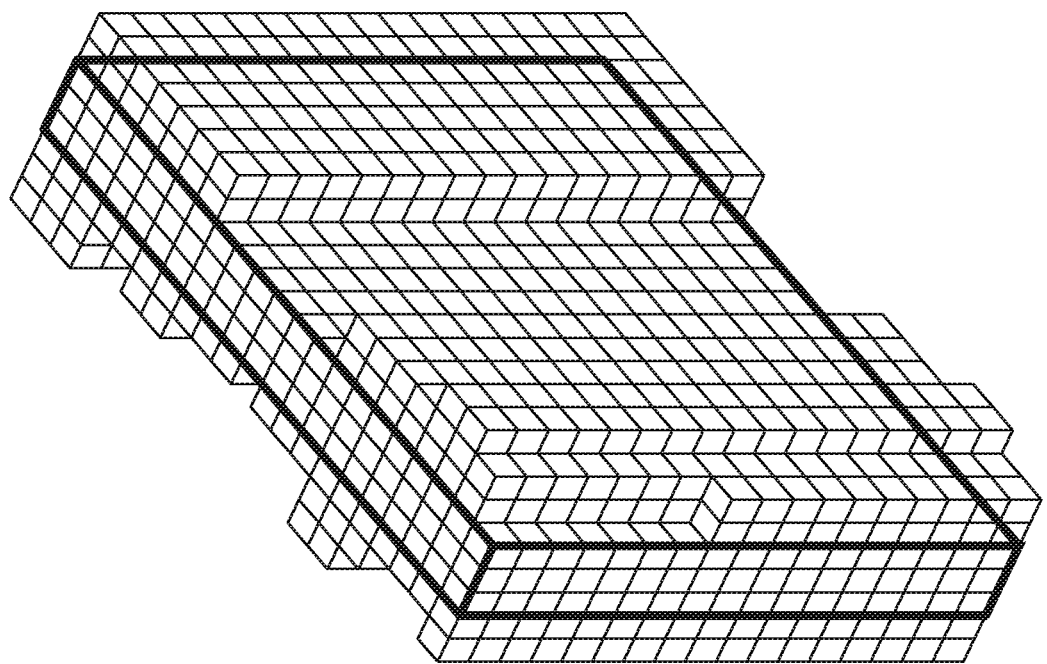
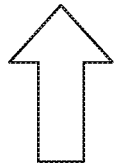
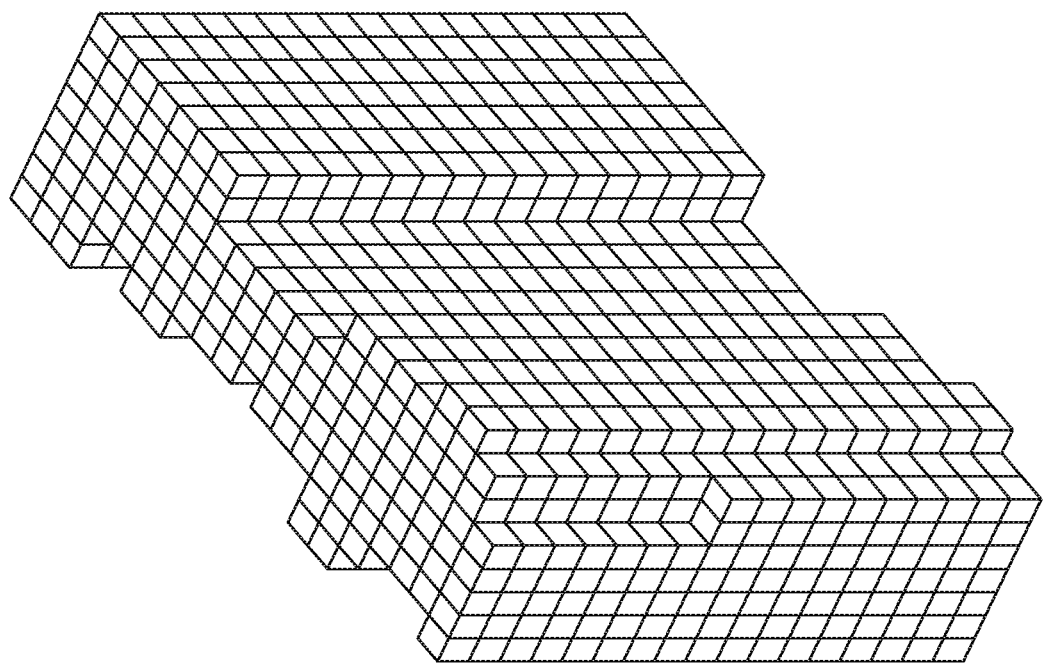
FIG.26

THREE-DIMENSIONAL ADVERTISING SPACE DETERMINATION SYSTEM, USER TERMINAL, AND THREE-DIMENSIONAL ADVERTISING SPACE DETERMINATION COMPUTER

CROSS REFERENCE TO RELATED APPLICATIONS

This application is a Continuation-in-Part of International Patent Application No. PCT/JP2016/058912, filed on Mar. 22, 2016 designating the United States, which International Patent Application claimed the benefit of Japanese Application No. 2015-112367 filed Jun. 2, 2015, each of which are incorporated herein by reference in their entirety.

TECHNICAL FIELD

The present invention relates to a stereoscopic advertising frame determination system in free viewpoint motion image data, and more particularly, to setting of an advertising frame.

BACKGROUND ART

Patent Document 1 discloses that an arbitrary projection frame from a free viewpoint is displayed as an advertising frame in free viewpoint motion image data.

The advertising frame can be set in a three-dimensional space in that system, so that an infinite number of advertising frames can be set in contrast to advertising in a conventional two-dimensional screen.

CITATION LIST

Patent Documents

Patent Document 1: Japanese Patent Application Laid-Open No. 2014-41259

SUMMARY OF INVENTION

Technical Problem

However, the method described in Patent Document 1 has a problem as follows. Although the advertising frame is originally set for advertising effects, the problem arises that the advertising fails to be displayed when being slightly mispositioned.

It is an object of the present invention to provide an advertising system that can set an effective advertising frame in a free viewpoint motion image.

These and other objects, uses, effects, or the like of this invention will become more apparent in consideration of examples and drawings.

Solution to Problem

1) A stereoscopic advertising frame determination system according to the present invention includes a user terminal and a stereoscopic advertising frame determination computer. The user terminal is configured to receive content data formed of a free viewpoint motion image in which a viewing viewpoint can be changed from a distribution computer and display motion image data from a specific viewpoint on a display means. The user terminal is configured to display, when an operator applies viewpoint characteristic changing data that changes viewpoint characteristics to the displayed specific viewpoint motion image data, the specific viewpoint motion image data on the display means based on the viewpoint characteristic changing data. A) The user terminal further includes a focused space determining means and a transmitting means. The focused space determining means determines a focused space in the specific viewpoint motion image on the basis of the specific viewpoint motion image data displayed on the display means. The transmitting means transmits transitional history of the focused space to the stereoscopic advertising frame determination computer. B) The stereoscopic advertising frame determination computer includes a user-specific history data receiving means and a stereoscopic advertising frame determining means. The user-specific history data receiving means receives the transitional history of the content data. The stereoscopic advertising frame determining means determines a content-specific stereoscopic advertising frame obtained from the user-specific history data.

Therefore, the stereoscopic advertising frame determination system that can set an effective advertising frame can be provided.

2) A stereoscopic advertising frame determination system according to the present invention includes a user terminal and a stereoscopic advertising frame determination computer. The user terminal is configured to receive content data formed of a free viewpoint motion image in which a viewing viewpoint can be changed from a distribution computer and display motion image data from a specific viewpoint on a display means. The user terminal is configured to display, when an operator applies viewpoint characteristic changing data that changes viewpoint characteristics to the displayed specific viewpoint motion image data, the specific viewpoint motion image data on the display means based on the viewpoint characteristic changing data. A) The user terminal further includes a focused space basic data creating means and a transmitting means. The focused space basic data creating means creates focused space determining basic data to determine a focused space in the specific viewpoint motion image on the basis of the specific viewpoint motion image data displayed on the display means. The transmitting means transmits transitional history of the focused space basic data to the stereoscopic advertising frame determination computer. B) The stereoscopic advertising frame determination computer includes a user-specific history data receiving means and a stereoscopic advertising frame determining means. The user-specific history data receiving means receives the transitional history of the content data. The stereoscopic advertising frame determining means determines a content-specific stereoscopic advertising frame obtained from the user-specific history data.

Therefore, the stereoscopic advertising frame determination system that can set an effective advertising frame can be provided.

3) In the stereoscopic advertising frame determination system according to the present invention, the stereoscopic advertising frame determining means determines a content-specific stereoscopic advertising frame from the transitional history of a plurality of users. Therefore, a content-specific stereoscopic advertising frame can be determined from transitional history of a plurality of users.

4) In the stereoscopic advertising frame determination system according to the present invention, the stereoscopic advertising frame determining means determines the stereoscopic advertising frame from a duplicate focused space in the transitional history of the plurality of users. Therefore, a content-specific stereoscopic advertising frame can be determined from a duplicate focused space in transitional history of a plurality of users.

5) In the stereoscopic advertising frame determination system according to the present invention, the stereoscopic advertising frame is a stereoscopic advertising frame that fluctuates on a time-series basis depending on a viewpoint condition of a user who views the content data. Therefore, a time-series stereoscopic advertising frame that fluctuates in viewpoint conditions in which a user actually views can be provided.

6) In the stereoscopic advertising frame determination system according to the present invention, the focused space determining means determines, as the focused space, a display region from a viewpoint and viewpoint directions that are currently designated and a spatial region determined by depth specified data that is provided. Therefore, an arbitrary spatial region can be provided as a time-series stereoscopic advertising frame.

7) In the stereoscopic advertising frame determination system according to the present invention, the depth specified data is added to the content data. Therefore, a focused region in a depth direction can be determined according to characteristics of content.

8) In the stereoscopic advertising frame determination system according to the present invention, the depth specified data fluctuates according to the content. Therefore, a focused region in the depth direction can be determined according to the content.

9) In the stereoscopic advertising frame determination system according to the present invention, the depth specified data fluctuates according to a zoom ratio of a free viewpoint motion image. Thus, a focused region in the depth direction can be changed when a free viewpoint motion image is zoomed in or zoomed out.

10) In the stereoscopic advertising frame determination system according to the present invention, the focused space determining means determines, as the focused space, a display region from a viewpoint and viewpoint directions that are designated and the whole of a spatial region determined by the depth specified data that is provided. Therefore, the whole of the spatial region can be treated as the focused space.

11) In the stereoscopic advertising frame determination system according to the present invention, the focused space determining means determines, as the focused space, a display region from a viewpoint and viewpoint directions that are designated and a part of a spatial region determined by the depth specified data that is provided. Therefore, the part of the spatial region can be treated as the focused space.

12) In the stereoscopic advertising frame determination system according to the present invention, the focused space determining means determines, as the focused space, the display region from the viewpoint and the viewpoint directions that are designated and a substantially central region of a space determined by the depth specified data that is provided. Therefore, the substantial center of the spatial region can be treated as the focused space.

13) In the stereoscopic advertising frame determination system according to the present invention, the focused space determining means is the display region from the viewpoint and the viewpoint directions that are designated and a region including a moving object in a space determined by the depth specified data that is provided. Therefore, the region including the moving object can be treated as the focused space.

14) In the stereoscopic advertising frame determination system according to the present invention, the focused space determining means applies a smaller weight to the detected region closer to a periphery. Therefore, a stereoscopic advertising frame in which a portion around the center is further emphasized can be set in the spatial region.

15) In the stereoscopic advertising frame determination system according to the present invention, the focused space determining means applies a smaller weight to the detected region farther in an XY direction.

Therefore, a stereoscopic advertising frame in which a portion around the center in the XY direction is further emphasized can be set in the spatial region.

16) In the stereoscopic advertising frame determination system according to the present invention, the focused space determining means applies a smaller weight to the detected region farther in a depth direction. Therefore, a stereoscopic advertising frame in which a portion around the center in the depth direction is further emphasized can be set in the spatial region.

17) In the stereoscopic advertising frame determination system according to the present invention, the focused space determining means includes a focused space detecting means for detecting a space on which a current user focuses, and a region detected by the focused space detecting means is determined as the focused space. Therefore, a stereoscopic advertising frame can be created based on a real focused region.

18) A stereoscopic advertising frame determination computer is connected to a user terminal described below. The user terminal is configured to receive content data formed of a free viewpoint motion image in which a viewing viewpoint can be changed and display motion image data from a specific viewpoint on a display means. The user terminal is configured to display, when an operator applies viewpoint characteristic changing data that changes viewpoint characteristics to the displayed specific viewpoint motion image data, the specific viewpoint motion image data based on the viewpoint characteristic changing data. The stereoscopic advertising frame determination computer includes a user-specific history data receiving means, a user-specific history data storage means, and a stereoscopic advertising frame determining means. The user-specific history data receiving means receives transitional history of a focused space of each specific viewpoint motion image data displayed on the display means as user-specific history data. The user-specific history data storage means stores the user-specific history data by the content. The stereoscopic advertising frame determining means determines a stereoscopic advertising frame of the content from the user-specific history data.

Therefore, a stereoscopic advertising frame determined from the user-specific history of the focused space can be obtained.

19) A stereoscopic advertising frame determination computer is connected to a user terminal described below. The user terminal is configured to receive content data formed of a free viewpoint motion image in which a viewing viewpoint can be changed and display motion image data from a specific viewpoint on a display means. The user terminal is configured to display, when an operator applies viewpoint characteristic changing data that changes viewpoint characteristics to the displayed specific viewpoint motion image data, the specific viewpoint motion image data based on the viewpoint characteristic changing data. The stereoscopic advertising frame determination computer includes a user-specific history data receiving means, a storage means, a determining means, and a stereoscopic advertising frame determining means. The user-specific history data receiving means receives transitional history of focused space determining basic data to determine a focused space in the specific viewpoint motion image data displayed on the user terminal. The storage means stores the transitional history of the focused space determining basic data. The determining means determines history of a user-specific focused space from the transitional history of the focused space determining basic data. The stereoscopic advertising frame determining means determines a content-specific stereoscopic advertising frame on the basis of the history of the user-specific focused space.

Therefore, a stereoscopic advertising frame determined from the transitional history of the focused space determining basic data can be obtained.

20) A user terminal according to the present invention is configured to receive content data formed of a free viewpoint motion image in which a viewing viewpoint can be changed from a distribution computer and display motion image data from a specific viewpoint on a display means. The user terminal is configured to display, when an operator of the user terminal applies viewpoint characteristic changing data that changes viewpoint characteristics to the displayed specific viewpoint motion image data, the specific viewpoint motion image data on the display means based on the viewpoint characteristic changing data. The user terminal includes a focused space determining means and a transmitting means. The focused space determining means determines a focused space in the specific viewpoint motion image on the basis of the specific viewpoint motion image data displayed on the display means. The transmitting means transmits transitional history of the focused space to the stereoscopic advertising frame determination computer. Therefore, the focused space in the specific viewpoint motion image data can be supplied to the stereoscopic advertising frame determination computer.

21) A user terminal according to the present invention is configured to receive content data formed of a free viewpoint motion image in which a viewing viewpoint can be changed from a distribution computer and display motion image data from a specific viewpoint on a display means. The user terminal is configured to display, when an operator of the user terminal applies viewpoint characteristic changing data that changes viewpoint characteristics to the displayed specific viewpoint motion image data, the specific viewpoint motion image data on the display means based on the viewpoint characteristic changing data. The user terminal includes a focused space basic data creating means and a transmitting means. The focused space basic data creating means creates focused space determining basic data to determine a focused space in the specific viewpoint motion image displayed on the display means. The transmitting means transmits transitional history of the focused space basic data to the stereoscopic advertising frame determination computer. Therefore, a stereoscopic advertising frame can be determined from the transitional history of the focused space basic data in the stereoscopic advertising frame determination computer.

22) In a method for determining a stereoscopic advertising frame according to the present invention, a distribution computer, a user terminal, and a stereoscopic advertising frame determination computer are connected to one another. The user terminal is configured to receive content data formed of a free viewpoint motion image in which a viewing viewpoint can be changed from the distribution computer and display motion image data from a specific viewpoint on the user terminal. The user terminal is configured to display, when an operator applies viewpoint characteristic changing data that changes viewpoint characteristics to the displayed specific viewpoint motion image data, the specific viewpoint motion image data based on the viewpoint characteristic changing data. A) The user terminal includes the following steps of: determining a focused space in the specific viewpoint motion image on the basis of the displayed specific viewpoint motion image data; and transmitting transitional history of the focused space to the stereoscopic advertising frame determination computer. B) The stereoscopic advertising frame determination computer includes determining a content-specific stereoscopic advertising frame obtained from user-specific history data when receiving the transitional history of the content data. Therefore, an effective stereoscopic advertising frame can be supplied.

23) In a method for determining a stereoscopic advertising frame according to the present invention, a distribution computer, a user terminal, and a stereoscopic advertising frame determination computer are connected to one another. The user terminal is configured to receive content data formed of a free viewpoint motion image in which a viewing viewpoint can be changed from the distribution computer and display motion image data from a specific viewpoint on the user terminal. The user terminal is configured to display, when an operator applies viewpoint characteristic changing data that changes viewpoint characteristics to the displayed specific viewpoint motion image data, the specific viewpoint motion image data based on the viewpoint characteristic changing data. A) The user terminal includes the following steps of: creating focused space determining basic data to determine a focused space in the specific viewpoint motion image on the basis of the specific viewpoint motion image data displayed on the display means; and transmitting transitional history of the focused space basic data to the stereoscopic advertising frame determination computer. B) The stereoscopic advertising frame determination computer includes determining a content-specific stereoscopic advertising frame obtained from the transitional history when receiving the transitional history of the content data. Therefore, an effective stereoscopic advertising frame can be supplied.

24) Data according to the present invention is transitional history data of a content-specific focused space received from a user terminal. The data is formed of region specifying information on a time-series basis to specify a focused spatial region of a user at each playback time of a content-specific free viewpoint motion image displayed on the user terminal. Therefore, a content-specific duplicate focused space can be determined as a stereoscopic advertising frame by collecting a plurality of pieces of the transitional history data.

25) Data according to the present invention is focused space determining basic data to determine a focused space in the specific viewpoint motion image determined on the basis of specific viewpoint motion image data displayed on a display means of a user terminal. The data is formed of the focused space determining basic data on a time-series basis to specify a focused spatial region of a user at each playback time of a content-specific free viewpoint motion image displayed on the user terminal. Therefore, a content-specific duplicate focused space can be determined as a stereoscopic advertising frame by collecting a plurality of pieces of the transitional history data.

In this specification, a free viewpoint motion image includes all motion images that can display content by freely switching a viewpoint. Viewpoint characteristic changing data is data in which at least one of a viewpoint and viewpoint directions in combination is changed, and is also changing data at relative elapsed time from start. In the present embodiment, the viewpoint characteristic changing data is formed of a viewpoint, viewpoint directions, zooming, and relative elapsed time in combination. Note that zooming is not necessary. If a motion image is played back from one viewpoint in viewpoint directions from start of playback until end of the playback, the data is formed of the one viewpoint and the viewpoint directions. The data may include data that changes viewpoint characteristics other than this described above. Alternatively, the data may be represented by a relative change amount from current viewpoint characteristics.

BRIEF DESCRIPTION OF DRAWINGS

FIG. 7 is a flowchart of free viewpoint motion image distribution display processing.

FIGS. 8A-8D is an example of a data structure of viewpoint characteristic data.

FIG. 17 illustrates a data structure of user-specific operation data.

FIG. 18 is a flowchart of history data transmission processing.

FIG. 25 is an example of a stereoscopic advertising frame formed by shaving a part off the stereoscopic advertising frame in FIG. 24.

FIG. 26 is an example of a stereoscopic advertising frame formed by supplementing a part of the stereoscopic advertising frame in FIG. 24.

REFERENCE SIGNS LIST

1 Free viewpoint motion image distribution system
23 CPU
27 Memory
123 CPU
127 Memory
223 CPU
227 Memory

PREFERRED MODE FOR CARRYING OUT INVENTION

Outline of Free Viewpoint Motion image Distribution System 1

Figure 1:
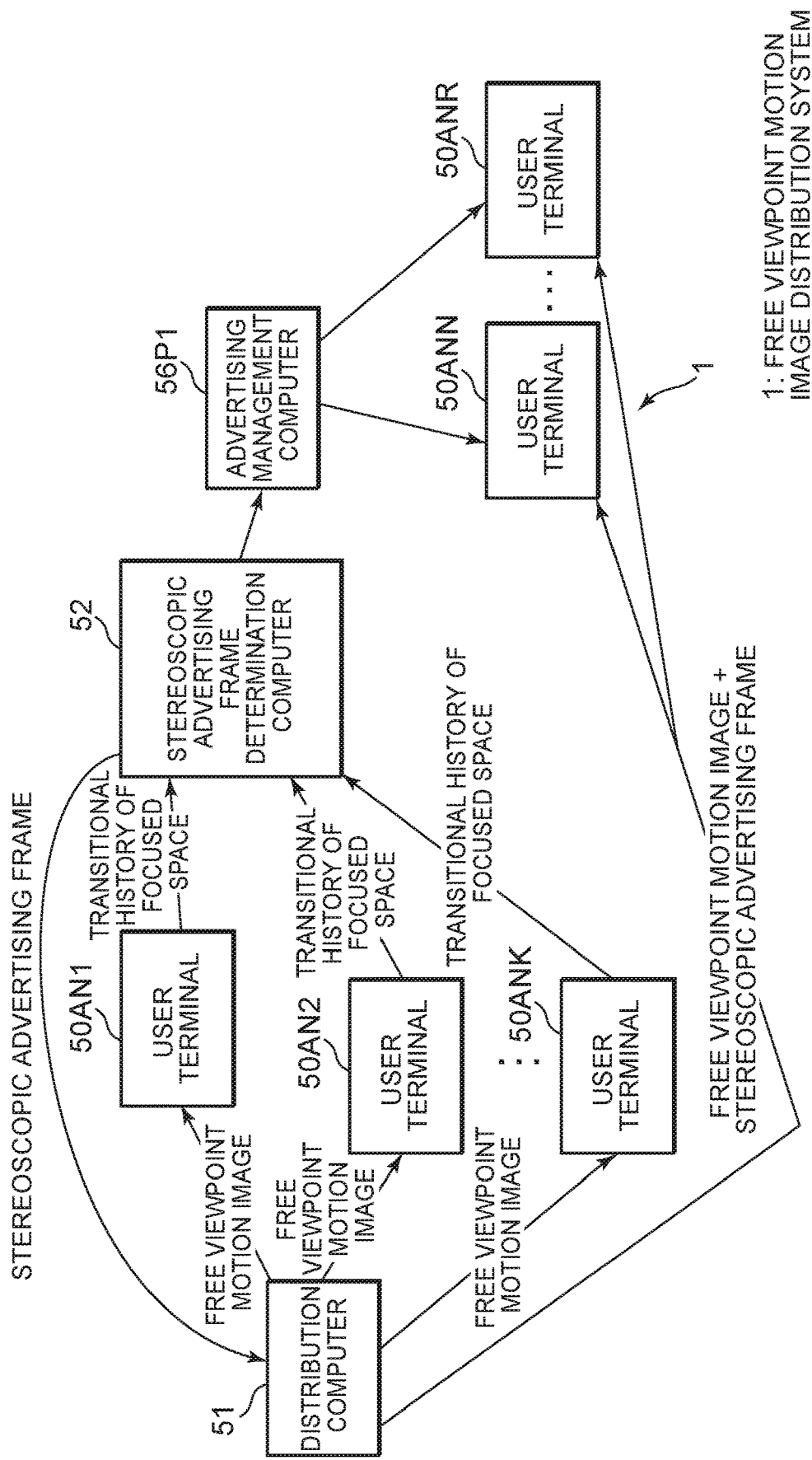
FIG. 1 is a diagram illustrating an outline of a free viewpoint motion image distribution system 1.

FIG. 1 illustrates a configuration of a free viewpoint motion image distribution system 1 according to the present invention. The free viewpoint motion image distribution system 1 includes a distribution computer 51, a plurality of user terminals 50AN1 to 50ANM, 50ANN to 50ANR, a stereoscopic advertising frame determination computer 52, and an advertising management computer 56P1.

The distribution computer 51 distributes free viewpoint motion image data in which content IDs are specified and viewpoint characteristic data (viewpoint and viewpoint directions) for changing a viewing viewpoint to each of the user terminals 50AN1 to 50ANK.

Each of the user terminals 50AN1 to 50ANK creates a motion image from the received free viewpoint motion image data and viewpoint characteristic data and displays the motion image. When an operator of the user terminal applies viewpoint characteristic changing data that changes viewpoint characteristics to the displayed specific viewpoint motion image data, the user terminals 50AN1 to 50ANK create specific viewpoint motion image data based on the viewpoint characteristic changing data. The user terminals 50AN1 to 50ANK extract history data of a focused region of the displayed image, and transmit the history data to the stereoscopic advertising frame determination computer 52.

The stereoscopic advertising frame determination computer 52 stores the history data for every user ID and every content ID and extracts a common region from focused regions of a plurality of users for each of the content IDs to determine the region as a stereoscopic advertising frame. The determined stereoscopic advertising frame is transmitted to the distribution computer 51, and is transmitted to the user terminals 50ANN to 50ANR when each free viewpoint motion image is distributed.

In response to a request from an advertising requesting computer (not shown), the advertising management computer 56P1 gives instructions to send a manuscript if there is a stereoscopic advertising frame whose advertising conditions match the stereoscopic advertising frame of each pieces of the content. Accordingly, a stereoscopic advertising frame is set in a space of each free viewpoint motion image on which many users focus in the user terminals 50ANN to 50ANR. A rough advertising region is defined by setting such a stereoscopic advertising frame. Thus, an effective advertising frame can be set even for the free viewpoint motion image.

Functional Block Diagram

Figure 2:
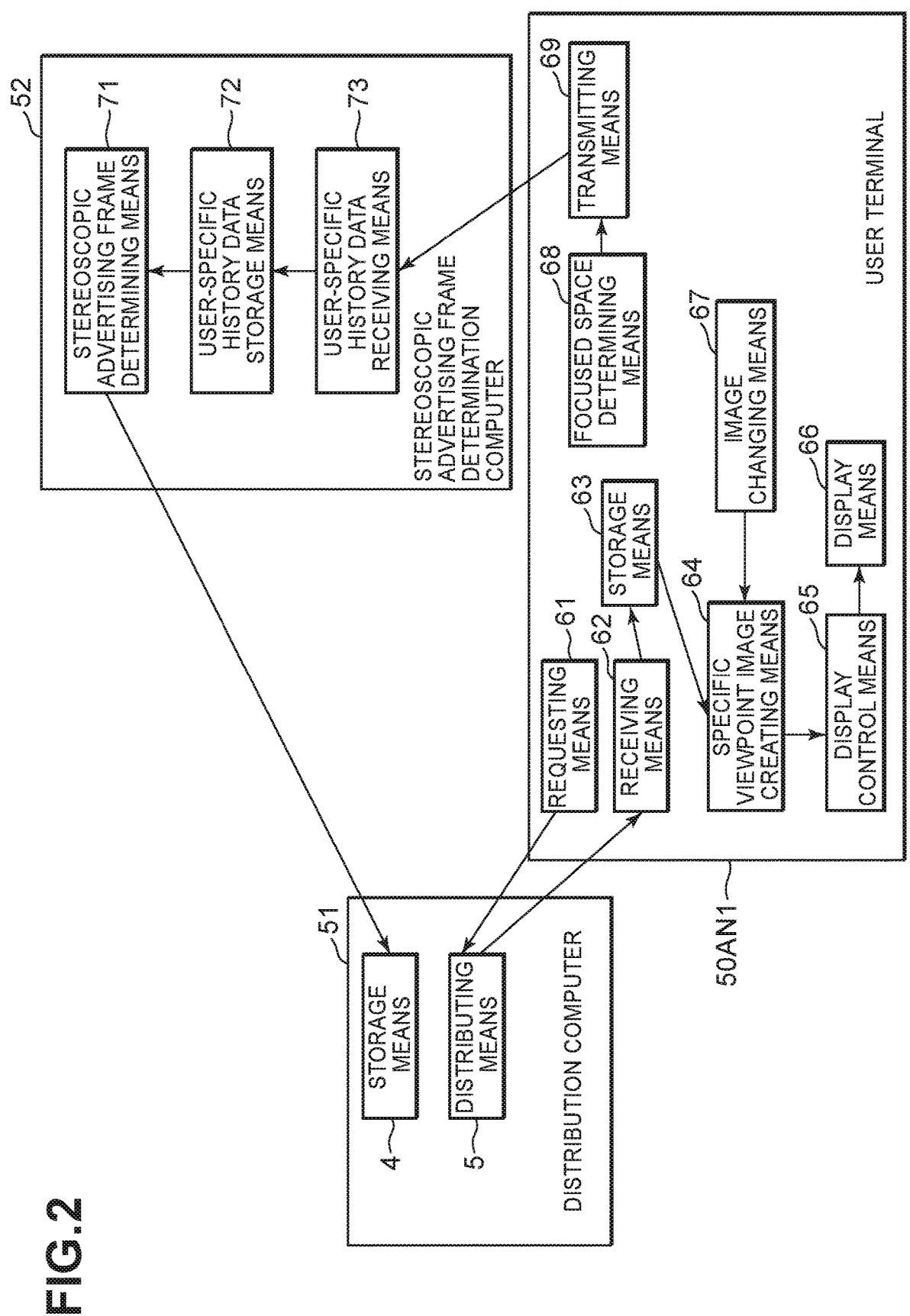
FIG. 2 is a functional block diagram of a distribution computer, a user terminal, and a stereoscopic advertising frame determination computer in the free viewpoint motion image distribution system 1.

FIG. 2 illustrates a functional block diagram of the distribution computer 51, the user terminal 50AN1, and the stereoscopic advertising frame determination computer 52 in the free viewpoint motion image distribution system 1.

2.1 Distribution Computer 51

The distribution computer 51 includes a storage means 4 and a distributing means 5. The storage means 4 stores a plurality of pieces of free viewpoint motion image data in which a viewing viewpoint can be changed. If receiving a distribution request in which an ID of free viewpoint motion image data is specified, the distributing means 5 distributes the specified free viewpoint motion image data to the user terminal 50AN1 that has transmitted the distribution request.

2.2 User Terminal 50AN1

The user terminal 50AN1 includes a requesting means 61, a receiving means 62, a storage means 63, a specific viewpoint image creating means 64, a display control means 65, a display means 66, an image changing means 67, a focused space determining means 68, and a transmitting means 69.

The requesting means 61 requests free viewpoint motion image data from the distribution computer 51. The receiving means 62 receives the free viewpoint motion image data transmitted from the distribution computer 51. The storage means 63 stores the received free viewpoint motion image data. Upon application of viewpoint characteristic data, the specific viewpoint image creating means 64 creates specific viewpoint motion image data for the stored free viewpoint motion image data based on the viewpoint characteristic data. The display control means 65 displays the created specific viewpoint motion image data on the display means 66 When an operator of the user terminal 50AN1 applies viewpoint characteristic changing data that changes viewpoint characteristics to the specific viewpoint motion image data displayed on the display means 66 the image changing means 67 causes the specific viewpoint image creating means 64 to create specific viewpoint motion image data based on the viewpoint characteristic changing data. The focused space determining means 68 determines a focused space in the created specific viewpoint motion image data. The transmitting means 69 transmits transitional history data of the focused space to the stereoscopic advertising frame determination computer 52.

2.3 Stereoscopic Advertising Frame Determination Computer 52

A user-specific history operation data receiving means 73 of the stereoscopic advertising frame determination computer 52 receives the transitional history data of the focused space. A user-specific history operation data storage means 72 stores the received user-specific transitional history data of the focused space as user-specific history data. A stereoscopic advertising frame determining means 71 determines a content-specific duplicate focused space obtained from the user-specific history data of a plurality of users as a stereoscopic advertising frame.

The stereoscopic advertising frame determining means 71 transmits the stereoscopic advertising frame as advertising frame information for every free viewpoint motion image data to the distribution computer 51. The distribution computer 51 stores the received stereoscopic advertising frame together with the corresponding free viewpoint motion image data. If receiving a distribution request for free viewpoint motion image data from another user terminal, the distribution computer 51 distributes the free viewpoint motion image data with the corresponding stereoscopic advertising frame.

In this way, for each free viewpoint motion image data, a duplicate focused space obtained from user-specific history data of a plurality of users is set as a stereoscopic advertising frame. Thus, an effective advertising frame can be set even for free viewpoint motion image.

In FIG. 2, the user terminal 50AN1 is described as a representative of the user terminals, but the same applies to the function of the other user terminals.

3. Hardware Configuration 3.1 Hardware Configuration of Distribution Computer 51

Figure 3:
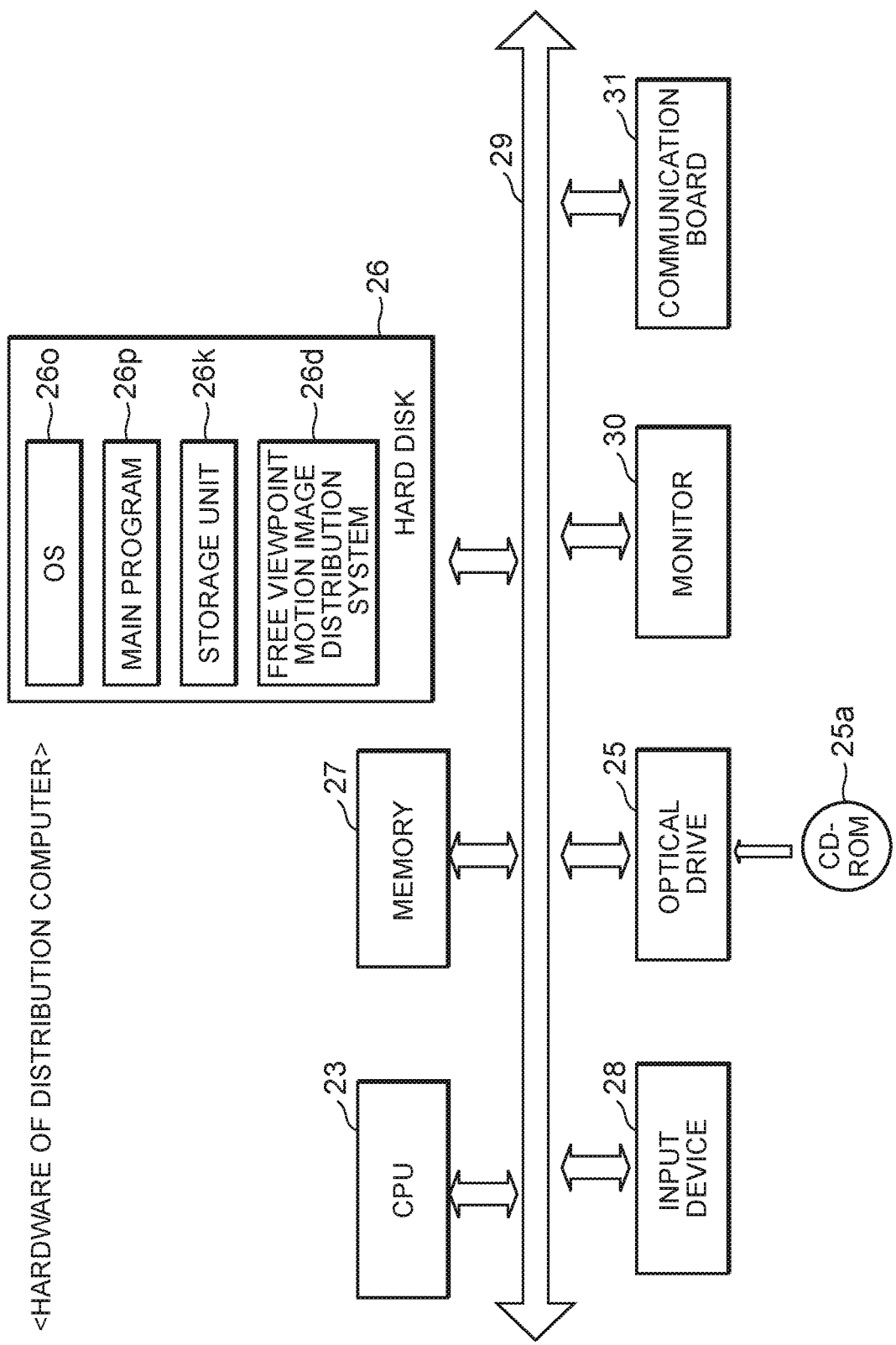
FIG. 3 is a hardware configuration of a distribution computer 51.

A hardware configuration of the distribution computer 51 is described with reference to FIG. 3. This diagram is an example of a hardware configuration in which the distribution computer 51 is formed of a CPU.

The distribution computer 51 includes a CPU 23, a memory 27, a hard disk 26, a monitor 30, an optical drive 25, an input device 28, a communication board 31, and a bus line 29. The CPU 23 controls each unit via the bus line 29 according to each program stored in the hard disk 26.

In the hard disk 26, an operating system program 26o (hereinafter abbreviated as OS) and a main program 26p are stored. Processing of the main program 26p is described below in detail. When receiving a distribution request in which a motion image ID is specified from a user terminal, the main program 26p distributes the corresponding free viewpoint motion image data.

Figure 4:
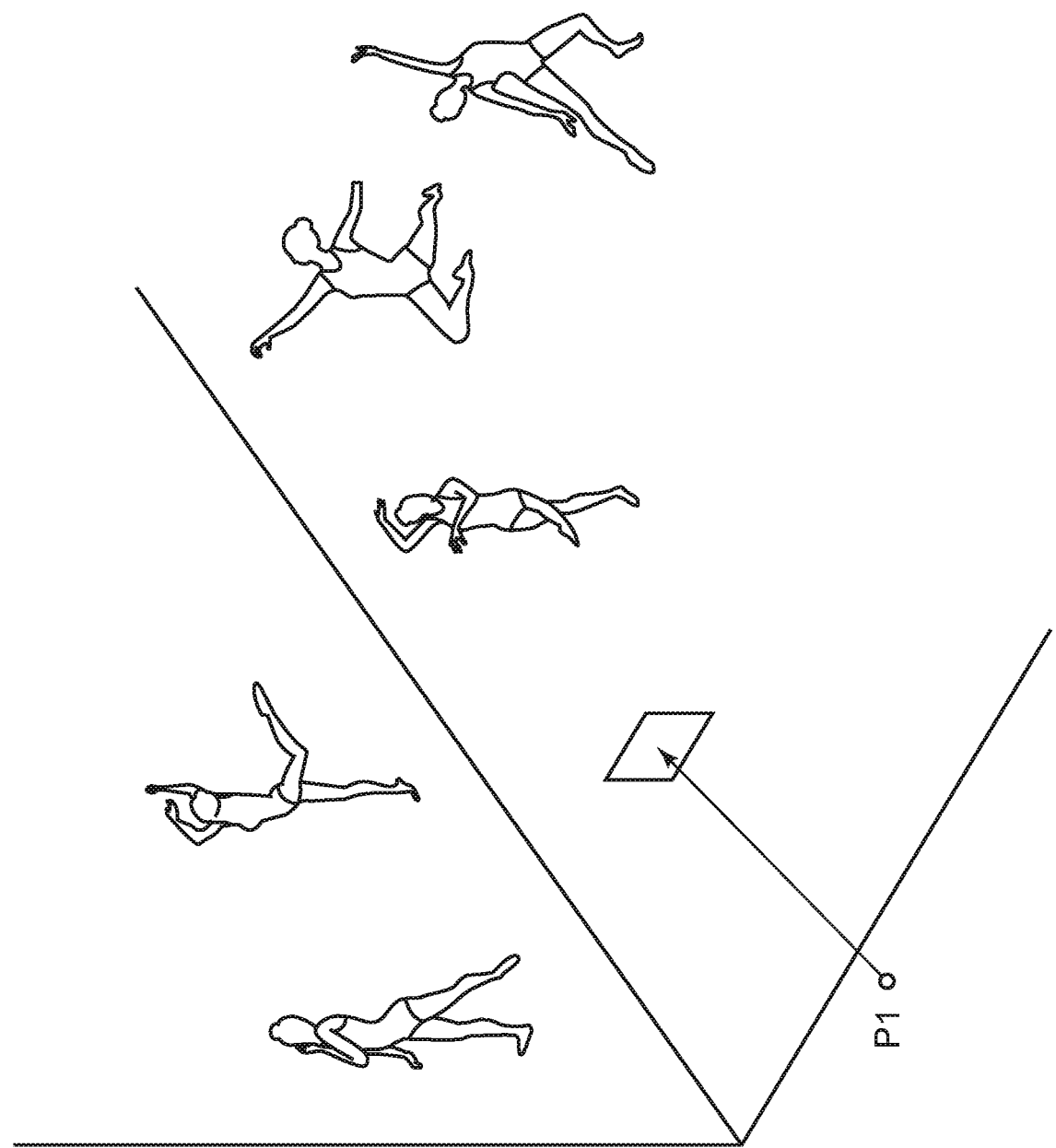
FIG. 4 illustrates an example of a free viewpoint motion image.

A plurality of free viewpoint motion images are stored in a free viewpoint motion image data storage unit 26d. Each of the free viewpoint motion images includes a motion image data ID, playback time, and an index word (not shown). FIG. 4 illustrates an example of a free viewpoint motion image. This example is a free viewpoint motion image in which one dancer is dancing while moving in an XYZ coordinate system. The free viewpoint motion image is provided with such an initial projection condition that the free viewpoint motion image is a projection image from a viewpoint P1 in viewpoint directions θ1, ϕ1 without zooming. In the present embodiment, a horizontal angle θ and an elevation angle ϕ are specified as the viewpoint directions, but any specifying method may be used.

In the present embodiment, Windows2008R2 (registered trademark or trademark) is adopted as the operating system program (OS) 26o, but it is not restrictive.

Note that each of the programs is read from a CD-ROM 25a that stores the programs via the optical drive 25 and installed in the hard disk 26. Note that programs of a flexible disk (FD), an IC card, or the like other than the CD-ROM may be installed from a computer-readable recording medium into the hard disk. Programs may also be downloaded with a communication circuit.

In the present embodiment, a program is installed from the CD-ROM into the hard disk 26 to cause a computer to indirectly execute the program stored in the CD-ROM. However, it is not restrictive, and the optical drive 25 may be caused to directly execute the program stored in the CD-ROM. Programs that can be executed by a computer certainly include programs that can be directly executed just by installing it, and include programs that need to be converted into another form once (for example, compressed data is decompressed) and programs that can be executed in combination with another module section.

3.2 Hardware Configuration of User Terminal 50AN1

Figure 5:
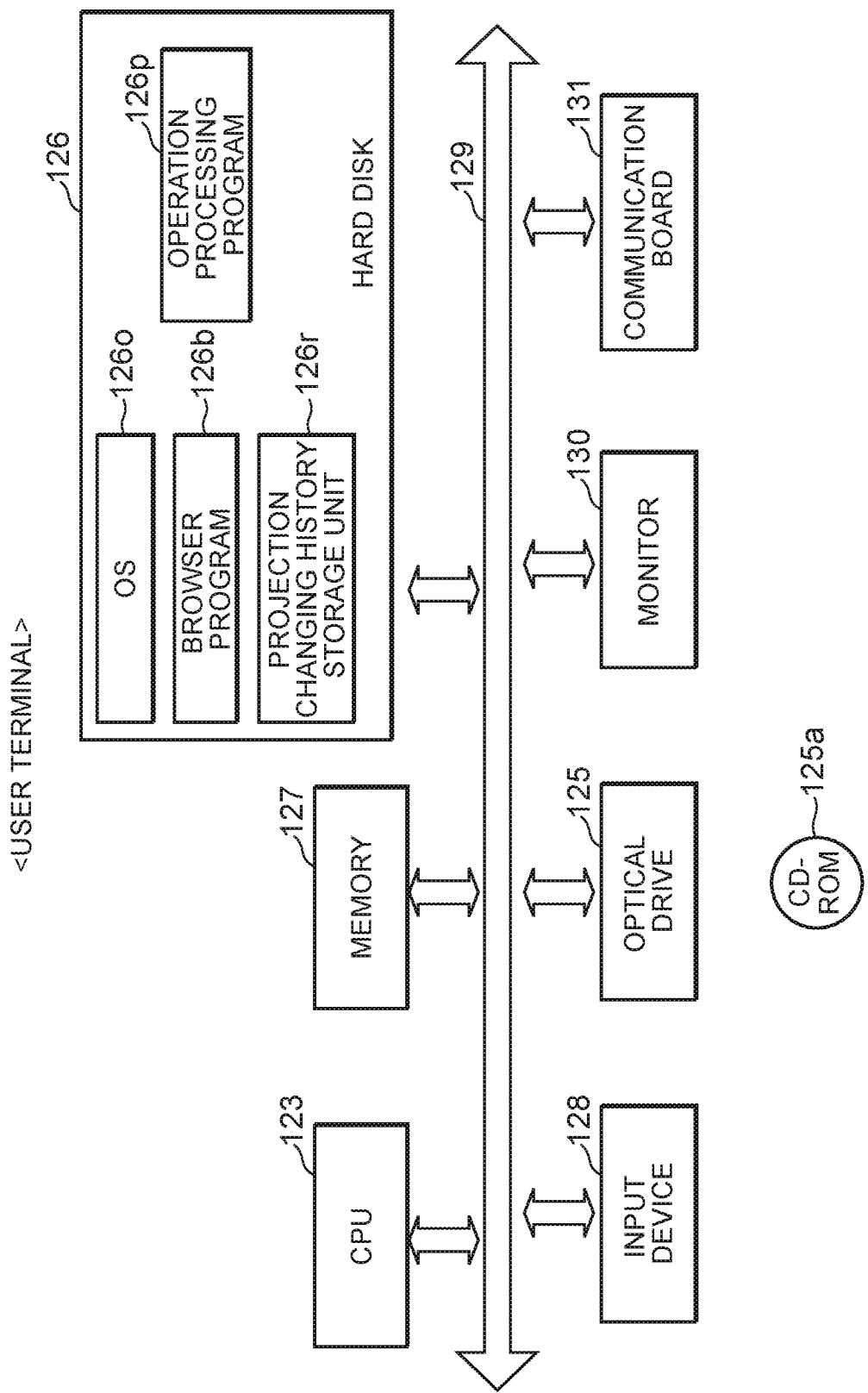
FIG. 5 is a hardware configuration of a user terminal.

FIG. 5 illustrates a hardware configuration of the user terminal 50AN1. A browser program 126b and an operation processing program 126p are stored in a hard disk 126. A CPU 123 displays a free viewpoint motion image on a monitor 130 by the browser program 126b. The CPU 123 creates a viewpoint switching image by a predetermined operation by a user and stores history data of a focused region for every unit time in a history storage unit 126r on the basis of the operation processing program 126p. Creation of such a viewpoint switching image and history data are described below.

The CPU 123 transmits the history data of the focused region for every unit time to the stereoscopic advertising frame determination computer 52.

The other configuration is the same as that of a typical personal computer. Note that the user terminal may be a tablet computer, a smartphone, a game machine, a smart television, or another household electrical appliance.

The operation processing program 126p is stored in the hard disk 126 in advance, but a necessary program may be executed in the browser program by plug-in processing.

In the present embodiment, the case where the browser program 126P, the operation processing program 126p, and the projection changing history storage unit 126r are stored in the hard disk 126 is described, but their storage location is not restrictive.

3.3 Hardware Configuration of Stereoscopic Advertising Frame Determination Computer 52

Figure 6:
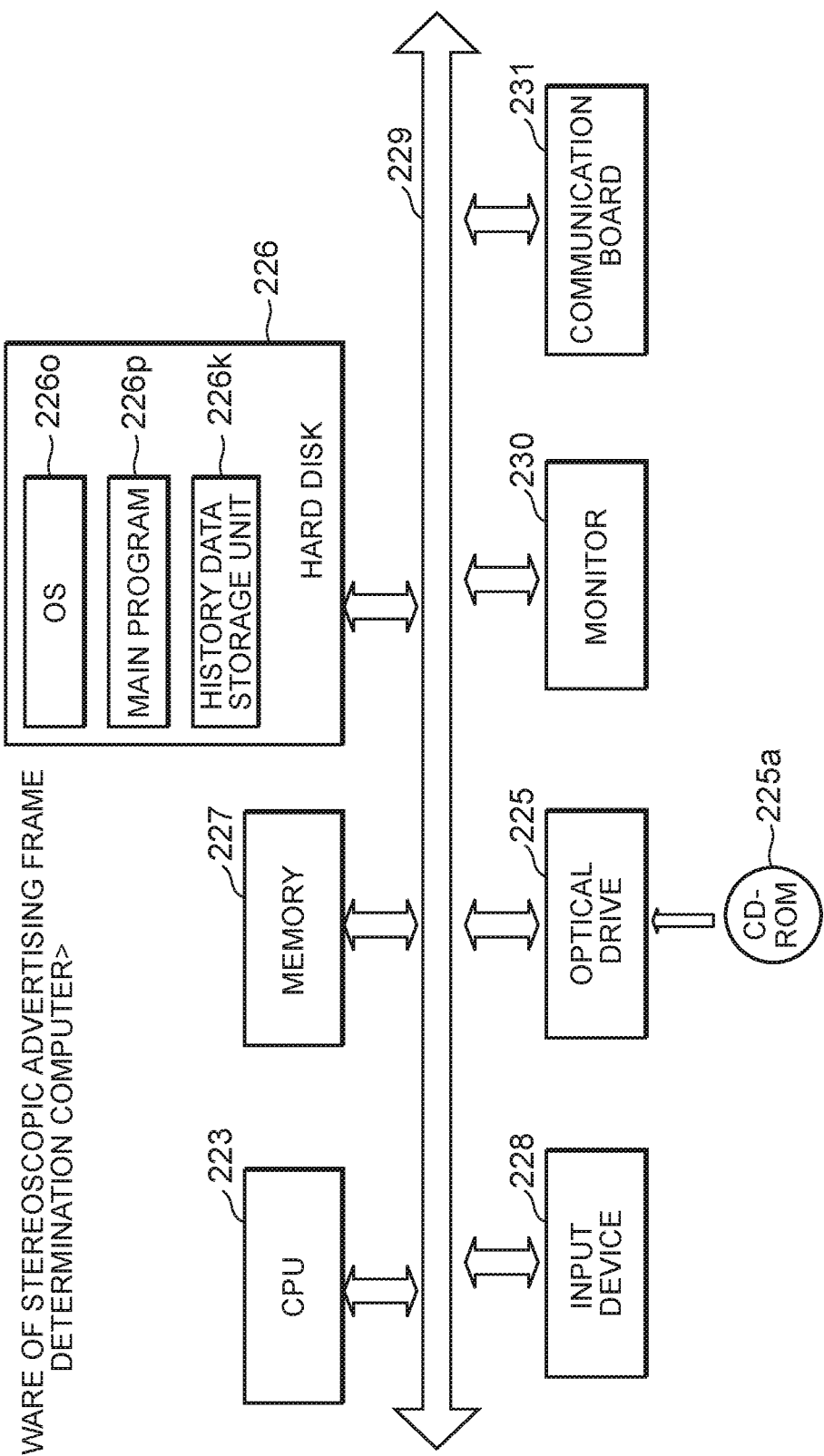
FIG. 6 is a diagram illustrating a hardware configuration of the stereoscopic advertising frame determination computer.

FIG. 6 illustrates a hardware configuration of the stereoscopic advertising frame determination computer 52. In a hard disk 226, history data of a focused region for every unit time received from each user terminal is stored. A CPU 223 determines a stereoscopic advertising frame for every free viewpoint motion image distributed by the distribution computer 51 on the basis of a main program 226p.

The other configuration is the same as that of a typical personal computer.

4. Flowchart (4.1 Free Viewpoint Motion image Distribution Display Process)

Free viewpoint motion image distribution display processing is described with reference to FIG. 7.

The CPU 123 of the user terminal 50AN1 judges whether there is a distribution request command from a user (Step S201 in FIG. 7). If there is a distribution request command, the CPU 123 transmits a distribution request to the distribution computer (Step S202). The CPU 23 of the distribution computer (see FIG. 3) judges whether there is a distribution request in which a free viewpoint motion image ID is specified from the user terminal 50AN1 (Step S203). If there is such a distribution request, the CPU 23 distributes a free viewpoint motion image and setting data to the user terminal 50AN1 (Step S207). In the present embodiment, viewpoint characteristic data in FIG. 8C serves as the setting data.

The CPU 123 of the user terminal 50AN1 judges whether to receive the free viewpoint motion image (Step S208). When receiving the free viewpoint motion image, the CPU 123 performs projection processing with the setting data (Step S209).

In this way, a plurality of kinds of free viewpoint motion images IDs are stored, transmitted to a user terminal upon a list request, and displayed in list form on the user terminal. A specific free viewpoint motion image selected by a user can be distributed to the user terminal.

(4.2 Projection Display Processing)

Figure 9:
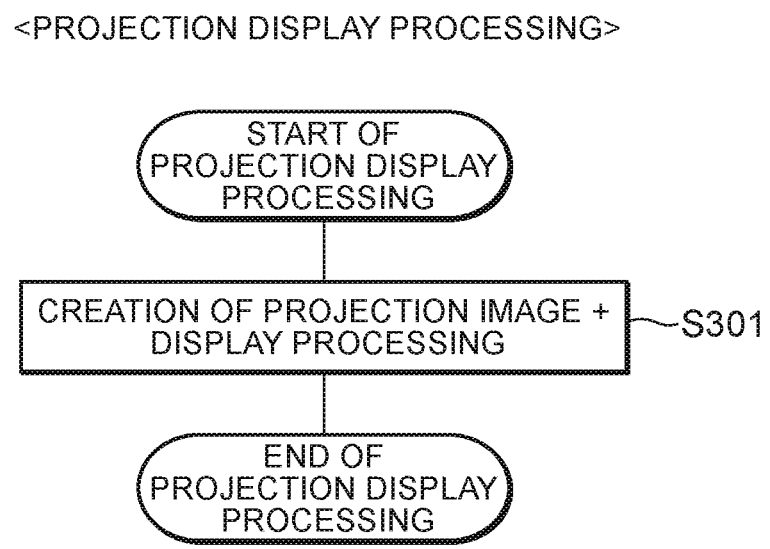
FIG. 9 is a flowchart of projection display processing.

The projection processing in Step S209 is described with reference to FIG. 9. When a play button (not shown) on a display screen is selected, the user terminal 50AN1 creates a projection image based on the free viewpoint motion image data and the setting data that have been distributed and displays the projection image on the monitor 130 (Step S301 in FIG. 9).

Figure 10:
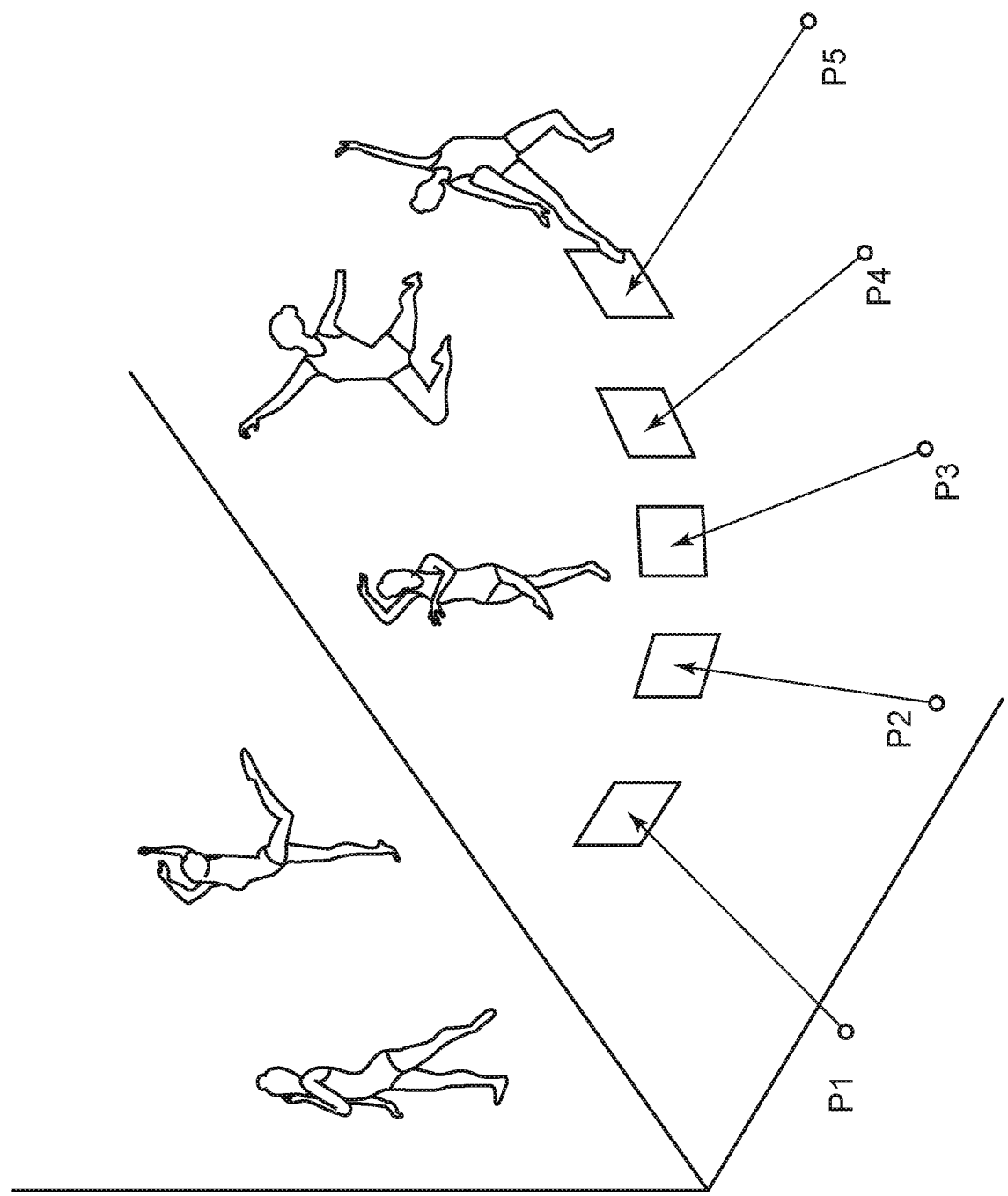
FIG. 10 is an example of a free viewpoint picture displayed on the user terminal.

In this case, two-dimensional projection data is created from the viewpoint characteristic data in FIG. 8C. The setting data illustrated in FIG. 8C is data for creating a projection image from a viewpoint P1 in viewpoint directions θ1, φ1 at time t0, a projection image in viewpoint directions θ2, φ2 by moving to a viewpoint P2 at time t1, a projection image in viewpoint directions θ3, φ3 by moving to a viewpoint P3 at time t2 a projection image in viewpoint directions θ4, φ4 with double zooming by moving to a viewpoint P4 at time t3, and a projection image in viewpoint directions θ5, φ5 with the double zooming by moving to a viewpoint P5 at time t4. In this case, if a target free viewpoint motion image is a motion image in which one dancer is dancing while changing a position with a lapse of time, such a projection motion image that a viewpoint and viewpoint directions are switching is displayed as illustrated in FIG. 10.

Note that a well-known coordinate transform technique may be used for creating a projection image from a free viewpoint motion image.

(4.3 Projection Changing Processing by User)

In the user terminal 50AN1, a projection image is displayed on the basis of the setting data. For such display, the projection image is changed by predetermined switching processing by a user. In the present embodiment, the projection image can be switched and displayed by switching a "viewpoint", "viewpoint directions", and "the presence or absence of zooming". A change of such a projection image is described with reference to FIG. 11.

Figure 11A:
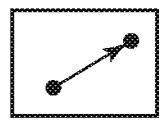
FIGS. 11A-11D is an example of an operation button displayed on the user terminal.

Operation buttons in FIGS. 11A to 11D are displayed outside a display region where a projection motion image is displayed in the user terminal 50AN1. The operation button in FIG. 11A is a mode of moving the display region of the screen, specifically, a mode of allowing the user to see a viewpoint in a tracking manner (tracking mode) as illustrated in FIG. 12 without changing a two-dimensional plane on which the free viewpoint motion image is projected. An amount of tracking is determined by designating it by the user with an input device.

Figure 11B:
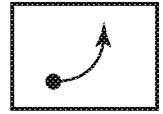
Figure 12:
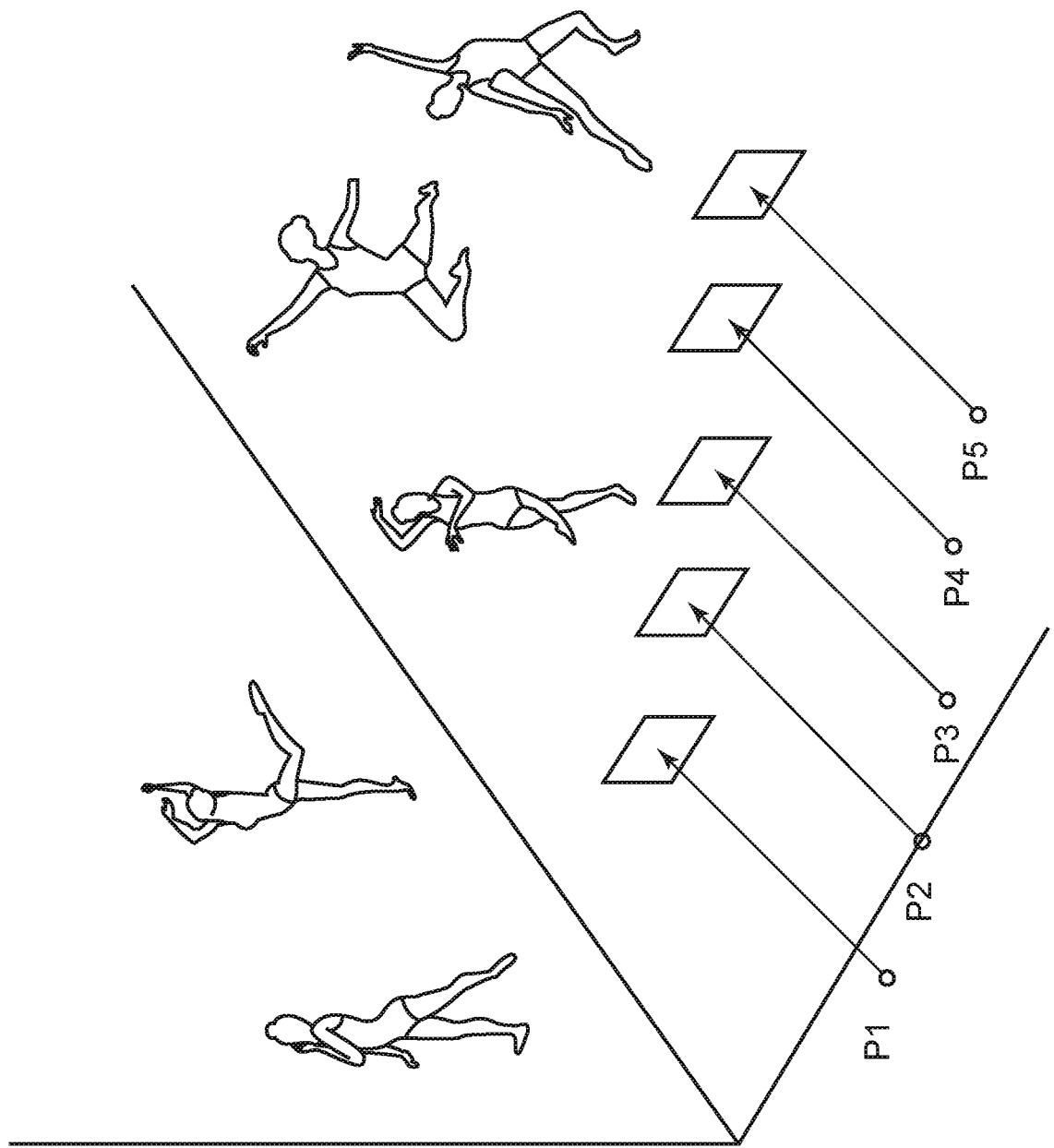
FIG. 12 is an example of a free viewpoint picture displayed on the user terminal.

The operation button in FIG. 11B is a mode of moving and changing the two-dimensional plane on which the free viewpoint motion image is projected, namely, a mode of allowing the user to see that the viewpoint is rotationally moving about a specific axis in a free viewpoint space. An amount of rotation is determined by designating it by the user with the input device. For example, it is a projection motion image from the viewpoint as illustrated in FIG. 10.

Figure 11C:
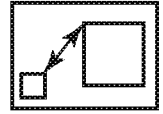
Figure 11D:
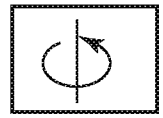
Figure 13:
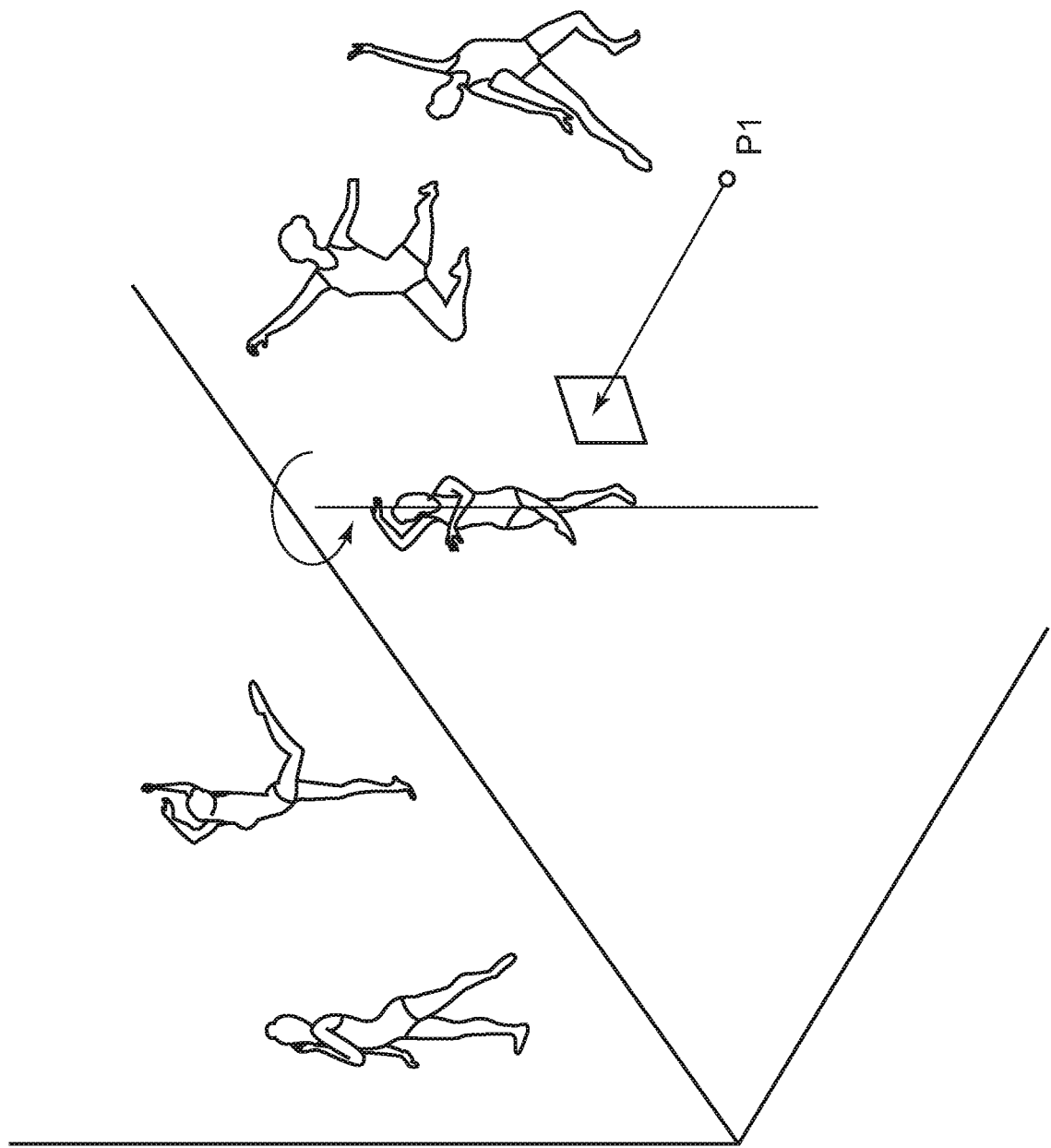
FIG. 13 is a diagram for explaining rotation processing of an object in the free viewpoint picture.

The operation button in FIG. 11C is used for zooming in and out on the screen. An amount of magnification and an amount of reduction are determined by designating them by the user with the input device. The operation button in FIG. 11D is a mode of designating an object in the screen and rotating it independently as illustrated in FIG. 13. A rotation axis can be freely set, and the rotation axis itself can also be rotated. Such an operation is performed only when the user wants motion that does not exist in the original motion image.

A change in a projection image when each of the operation buttons is selected while a free viewpoint motion image is playing back is described. Hereinafter, a case where the user plays back the projection image from the same viewpoint with the double zooming at the time t2 under the projection conditions of FIG. 8C and then switches the viewpoint to a viewpoint P6 at the time t3 and a viewpoint P7 at the time t4 is described.

Figure 14:
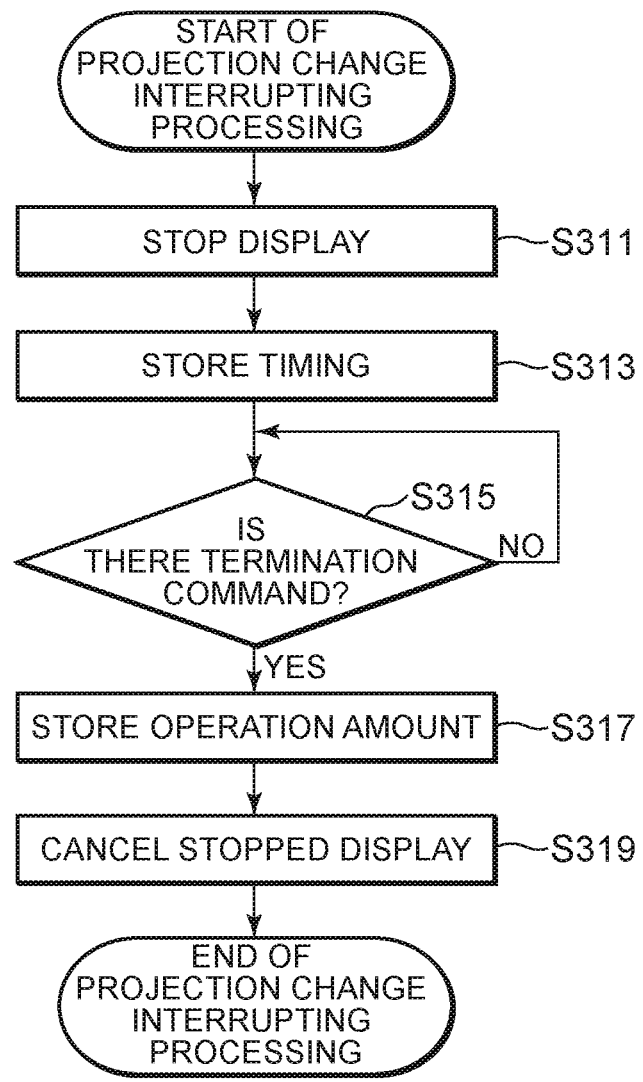
FIG. 14 is a flowchart of projection change interrupting processing.

The user operates a projection change interrupting processing button (not shown) when the viewpoint is moved to the viewpoint P3 in the viewing directions θ1, ϕ1 at the time t3. In the present embodiment, a click of the right mouse button is assigned to the projection change interrupting processing button, but any button can be assigned. Then, projection change interrupting processing as illustrated in FIG. 14 starts. The CPU 123 stops playback display (Step S311 in FIG. 14) and stores timing at which the projection change interrupting processing button is selected (Step S313). In the present embodiment, the selected timing is stored as time elapsed from a start of playing back the motion image, but it may be stored as the number of frames.

An operator of the user terminal 50AN1 provides an amount of zooming to the user terminal 50AN1 while operating the zoom button as illustrated in FIG. 11C. Desired processing herein is only zooming, and an interrupting processing termination command is thus provided. When the click of the right mouse button is operated again in such an interruption mode, the interrupting processing termination command is provided in the present embodiment, but this is not restrictive.

The CPU 123 judges whether the termination command is provided (Step S315). Upon such a command, the CPU 123 stores an amount of operation (Step S317). In this case, specifically, at the time t2, the "double zooming" is stored. The CPU 123 cancels the stopped display (Step S319) and ends the projection change interrupting processing.

This causes the motion image to play back. Next, the user operates the projection change interrupting processing button (not shown) at the time t3. The user switches the projection condition to the viewpoint P6, the viewpoint directions θ6, ϕ6, and the double zooming. The projection change interrupting processing ends, and the user similarly switches the projection condition to the viewpoint P7, the viewpoint directions θ7, ϕ7, and the double zooming at the time t4.

In this way, the user-specific operation data illustrated in FIG. 8D is stored in the user terminal.

(4.4 Determination Processing of Focused Region)

Next, determination processing of a focused region according to the present invention is described. The CPU 123 performs point application processing in FIG. 15 at every unit time on the basis of the operation processing program 126p.

The CPU 123 judges whether a current mode is stopped playback, during playback, during viewpoint movement, or during rotation of an object (Step S3). If the current mode is during playback, a point is "+1" (Step S11).

Figure 16:
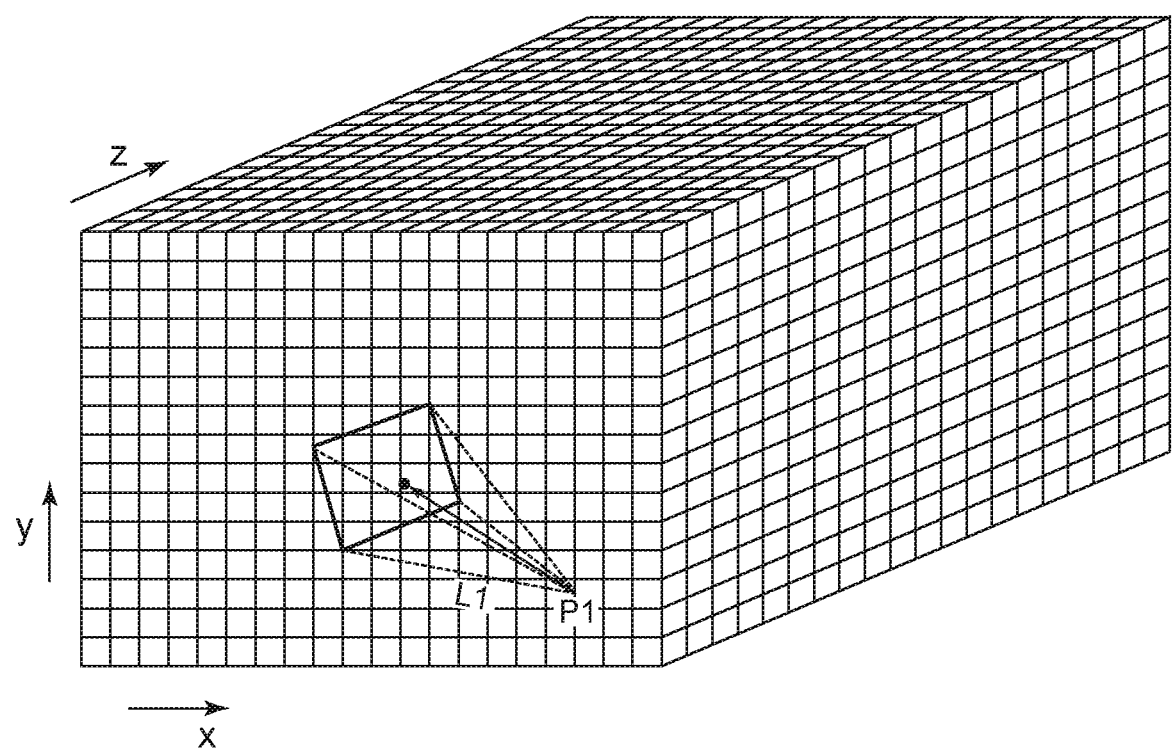
FIG. 16 is a diagram for explaining a relationship between an individual region and a focused region.

The CPU 123 acquires a current viewpoint condition (Step S21). Herein, it is assumed that the current viewpoint condition is a viewpoint P101 and viewpoint directions θ101, ϕ101 at time t101. The CPU 123 determines a target region (Step S23). In the present embodiment, if the target region is divided into a plurality of individual spaces as illustrated in FIG. 16, the individual spaces meet a projection region specified by a distance L1 from the viewpoint condition (viewpoint P1, viewpoint directions θ1, ϕ1). A predetermined value is determined as the distance L1 according to an attribute of each content in advance. For example, L1 is set to be long when the whole region is large such as a soccer game, and L1 is set to be short when the whole region is small such as a table tennis match. Herein, it is assumed that individual regions B (211,487,599), B (212,488,598), B (213,489,600) . . . B (212,477,588) are determined as target regions.

The CPU 123 applies the point determined in Step S11 to the determined target region. In this way, one point is applied to each of the individual regions B (211,487,599), B (212,488,598), B (213,489,600) . . . B (212,477,588) at the time t101 as illustrated in FIG. 17.

In the present embodiment, the applied point is changed according to the current mode. For example, if the current mode is during viewpoint movement in Step S3 in FIG. 15, the point is "+2" (Step S13). If the current mode is during rotation of an object, the point is "+3" (Step S15).

The reason is that it is assumed from the processing that the user is in a state of greatly focusing on the current display region.

Furthermore, the point is switched according to the way of stopping during stop. In other words, if stop is not caused by a screen touch, the point is "0" (Step S19), and if stop is caused by the screen touch, the point is "+1" (Step S18). The reason why the point is changed whether the stop is caused by the screen touch is that it is assumed that the user focuses on the display region on the screen when the stop is caused by the screen touch. On the contrary, when the stop is not caused by the screen touch, that is to say, when the stop is caused by a stop button (not shown), it is assumed that the user is in a state of not focusing on the display region. For example, the user is leaving his/her seat.

(4.5 History Data Transmission Processing)

Processing of transmitting history data of such a focused region to the stereoscopic advertising frame determination computer 52 is described with reference to FIG. 18.

The CPU 123 of the user terminal judges whether history data matches a transmission condition (Step S402). If the history data matches the transmission condition, the CPU 123 transmits the history data to the stereoscopic advertising frame determination computer (Step S403). In the present embodiment, time elapsed since the history data is stored is adopted as the transmission condition, and the CPU 123 transmits the history data from the user terminal to the stereoscopic advertising frame determination computer after the elapse of a predetermined amount of time. Such a transmission condition is not limited to the transmission condition described above. Time after the user finishes viewing the free viewpoint motion image or time after the user finishes a predetermined operation may be adopted as the transmission condition.

The stereoscopic advertising frame determination computer may inquire whether there is history that needs to be transmitted, and then, the user terminal may make a judgement.

The CPU 223 of the stereoscopic advertising frame determination computer judges whether the CPU 223 has received the history (Step S404). Upon reception, the CPU 223 stores the history as user-specific history data (Step S405).

The CPU 223 of the stereoscopic advertising frame determination computer performs stereoscopic advertising frame creation processing (Step S406).

(4.5 Stereoscopic Advertising Frame Determination Processing)

Stereoscopic advertising frame determination processing in the stereoscopic advertising frame determination computer 52 is described with reference to FIG. 19.

The CPU 223 reads history data of each user (Step S501) and sums up history data for every elapsed time (Step S503).

Figure 20:
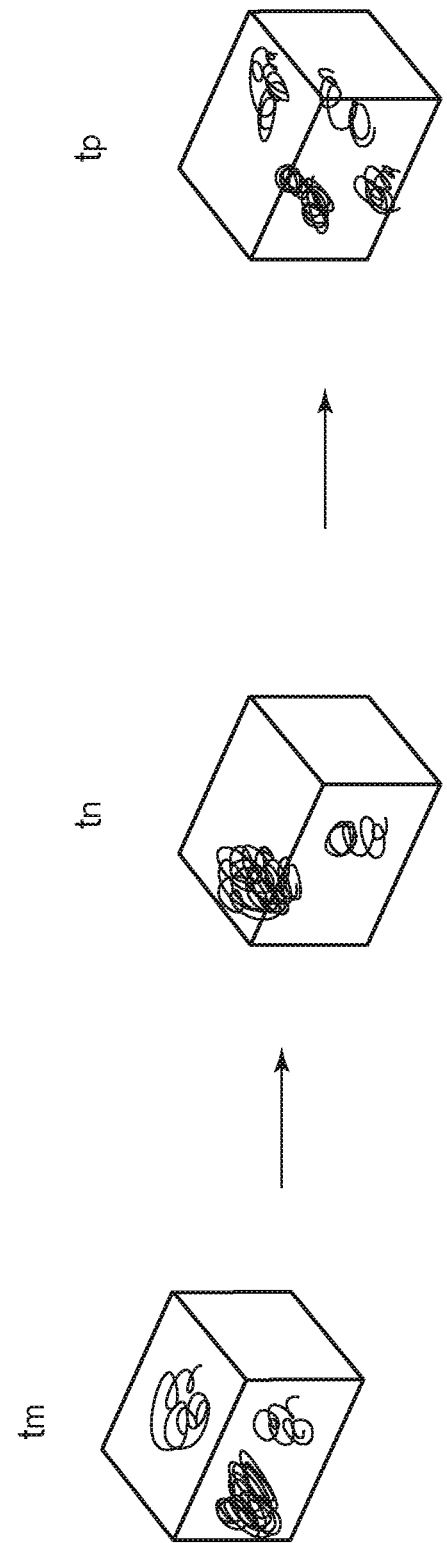
FIG. 20 is an example of a heat map at different time.

The CPU 223 creates a heat map at each elapsed time. The heat map is a visualized graph that indicates a magnitude of a total point in each individual space illustrated in FIG. 16 by a shade of color. FIG. 20 indicates the magnitude by a gray scale and actually uses colors in addition to shading (for example, red for an individual space having a high numerical value and green for an individual space having a low numerical value).

Such a heat map is created at every elapsed time. It is clear from FIG. 20 that group distribution of individual regions focused at time tm to time to to time tp is changed depending on elapsed time.

Figure 19:
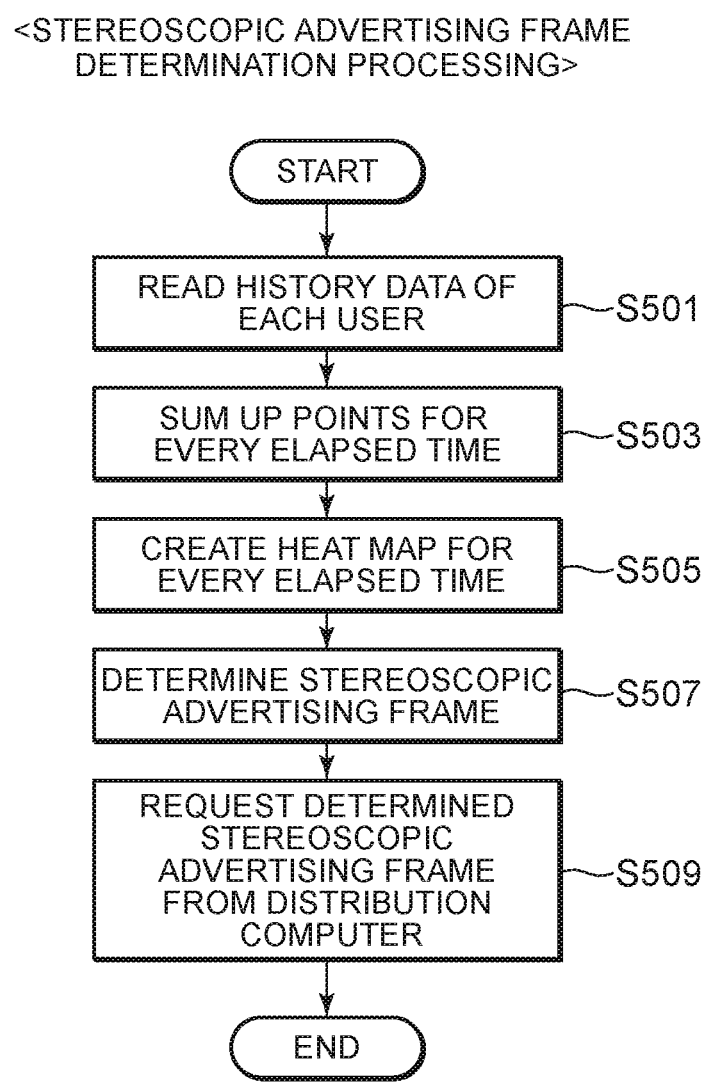
FIG. 19 is a flowchart of stereoscopic advertising frame determination processing.

The CPU 223 determines a stereoscopic advertising frame (Step S507 in FIG. 19). In the present embodiment, the CPU 223 determines, as the stereoscopic advertising frame, a frame in which the number of individual regions formed as a group exceeds a total threshold and its total point exceeds a total point threshold.

The CPU 223 requests the distribution computer 51 to distribute the content-specific stereoscopic advertising frame with each content (Step S509).

In this way, the distribution computer 51 distributes the stereoscopic advertising frame from next time onward when receiving a distribution request for the content (free viewpoint motion image) to which the stereoscopic advertising frame is set.

Although the group distribution is obtained by creating the heat map in the present embodiment, a connected individual region may be determined from the total in Step S503.

In the present embodiment, as processing in Step S507, the frame in which the number of individual regions formed as a group exceeds the total threshold and its total point exceeds the total point threshold is determined as the stereoscopic advertising frame. However, a frame in which one of them is satisfied may be determined as the stereoscopic advertising frame. Alternatively, another standard may be adopted.

In the present embodiment, a region in which operation history of a plurality of users overlaps is obtained to be determined as the stereoscopic advertising frame. In other words, AND operation is performed for the operation history of the plurality of users. However, this is not restrictive. If each individual region can be recognized as one region by performing OR operation on operation history of each user, the region may be determined as the stereoscopic advertising frame.

If the regions obtained from the AND operation and the OR operation are slightly apart from each other, the regions may be combined into one region. For example, if any of eight individual regions adjacent to a certain individual region is recognized as one group, they can be combined into one region.

Particularly when the stereoscopic advertising frame obtained from the AND operation is slightly apart, they may be combined into one region.

An attribute as a stereoscopic advertising frame may be changed between the stereoscopic advertising frame obtained from the AND operation and the stereoscopic advertising frame obtained from the OR operation. For example, the former is a focused space on which many users focus, so that the frame can be sold as an advertising frame having the high advertising effect on a specific user spectrum even if the frame is a small region. On the contrary, the advertising effect of the latter on a specific user spectrum is not that high, but the frame can be sold as an advertising frame on which a wide spectrum of users focuses.

In the present embodiment, the heat map is created on the basis of operation history of a plurality of users, but the heat map may be created on the basis of operation history of one user.

(4.6 Advertisement Processing)

The advertising management computer 56P1 illustrated in FIG. 1 manages an advertising frame of the determined stereoscopic advertising frame. Specifically, the advertising management computer 56P1 sells the advertising frame to an advertisement requesting computer that requests an advertisement, similarly to an advertising frame in a conventional two-dimensional website. Selling processing of such an advertising frame is the same as the case of a conventional Internet advertisement, so that its description will be omitted.

Figure 21:
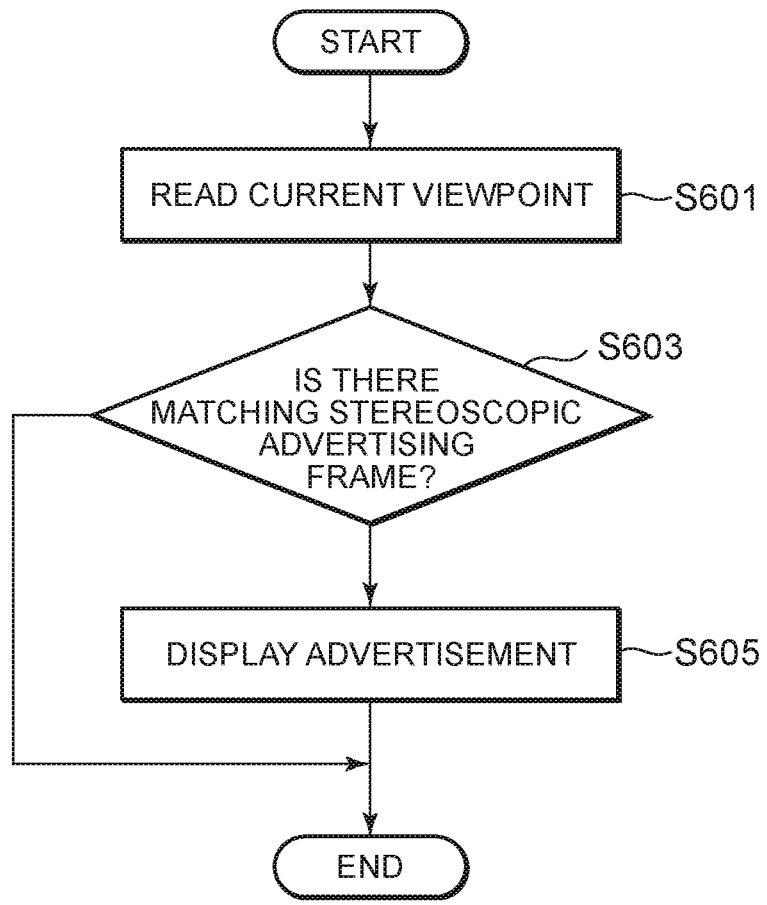
FIG. 21 is a flowchart of advertisement processing.

Advertisement display processing in the user terminal is described with reference to FIG. 21. The CPU 223 reads a current viewpoint (Step S601). The CPU 223 judges whether there is a stereoscopic advertising frame that matches the viewpoint (Step S603). If a stereoscopic advertising frame matches the viewpoint, an advertisement is displayed in the stereoscopic advertising frame (Step S605).

In this way, a common region in a space focused by the user in a free viewpoint motion image is set as a stereoscopic advertising frame, so that an effective advertising frame can be set.

Figure 15:
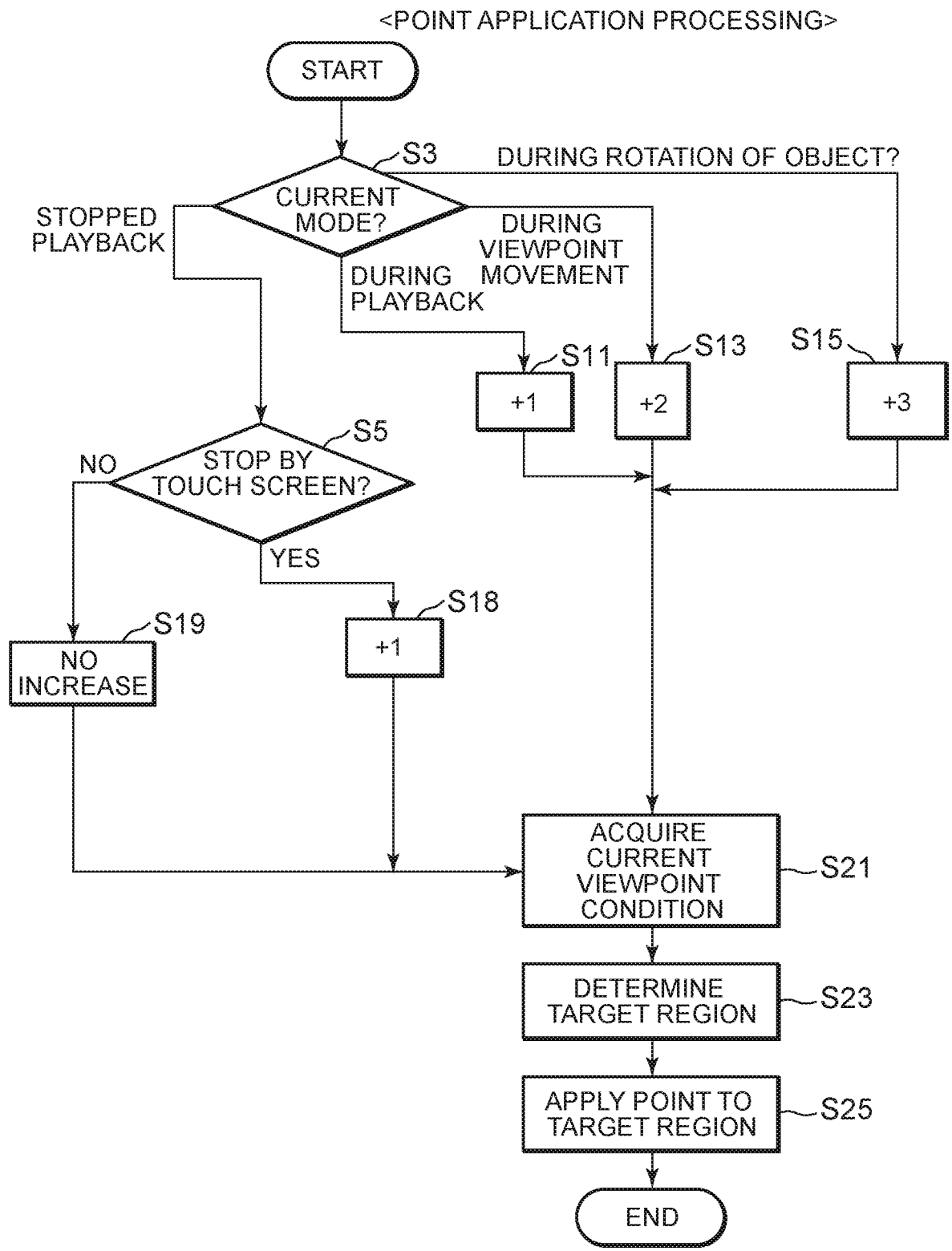
FIG. 15 is a flowchart of point application processing.

Whether there is the stereoscopic advertising frame that matches the viewpoint in Step S603 may be judged by determining the distance L similarly to Step S23 in FIG. 15, but it is not restrictive.

For example, a depth direction may not be a condition for matching the stereoscopic advertising frame. In other words, when a straight line determined by a viewpoint Px and viewpoint directions $\theta2$, $\phi2$ passes through the stereoscopic advertising frame, it may be judged that the viewpoint matches the stereoscopic advertising frame regardless of the depth direction.

Note that when the distribution computer 51 individually distributes a stereoscopic advertising frame, the stereoscopic advertising frame is distributed with content in the present embodiment. However, a free viewpoint motion image including an advertisement in the stereoscopic advertising frame may be created and broadcast. In this case, an advertising frame for each stereoscopic advertising frame may be sold beforehand similarly to a conventional TV broadcast.

The invention disclosed in the present embodiment can be grasped as the following system.

A stereoscopic advertising frame determination system includes a user terminal and a stereoscopic advertising frame determination computer. The user terminal is configured to receive content data formed of a free viewpoint motion image in which a viewing viewpoint can be changed from a distribution computer and display motion image data from a specific viewpoint on a display means. The user terminal is configured to display, when an operator applies viewpoint characteristic changing data that changes viewpoint characteristics to the displayed specific viewpoint motion image data, the specific viewpoint motion image data on the display means on the basis of the viewpoint characteristic changing data. A) The user terminal further includes a focused space determining means and a transmitting means. The focused space determining means determines a focused space in the specific viewpoint motion image based on the specific viewpoint motion image data displayed on the display means. The transmitting means transmits transitional history of the focused space to the stereoscopic advertising frame determination computer. B) The stereoscopic advertising frame determination computer includes a user-specific history data receiving means and a stereoscopic advertising frame determining means. The user-specific history data receiving means receives the transitional history of the content data. The stereoscopic advertising frame determining means determines a content-specific stereoscopic advertising frame obtained from the user-specific history data.

5. Second Embodiment

Figure 22:
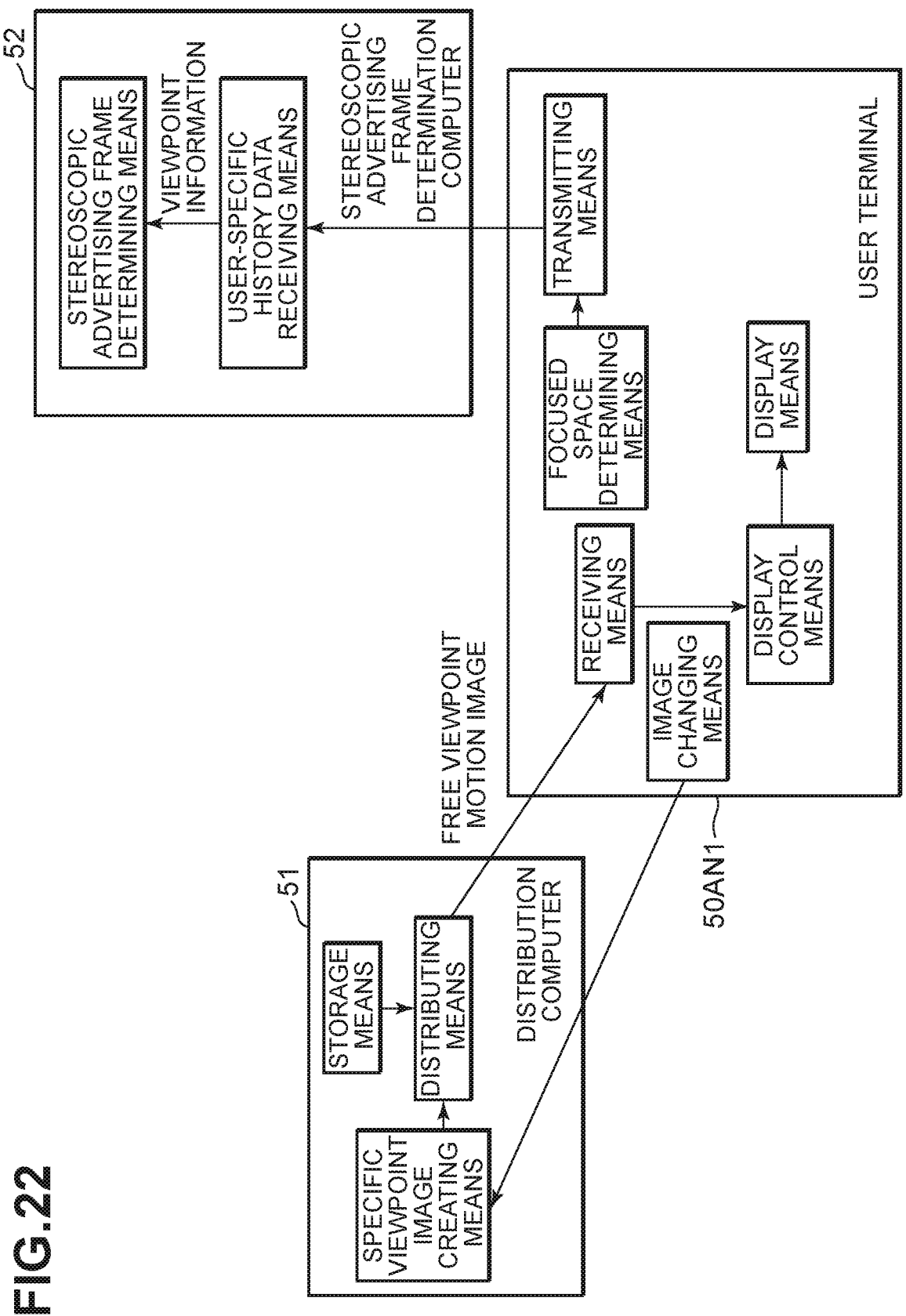
FIG. 22 is a functional block diagram of a distribution computer, a user terminal, and a stereoscopic advertising frame determination computer in a second embodiment.

In the above-described embodiment, a free viewpoint motion image is created in a user terminal, but a free viewpoint motion image may be created in a distribution device by providing viewpoint switching data to the distribution device and transmitted to a user terminal. In this case, a free viewpoint motion image distribution system has the following configuration as illustrated in FIG. 22.

A stereoscopic advertising frame determination system includes a distribution computer, a user terminal, and a stereoscopic advertising frame determination computer. A) The distribution computer includes the following means. The distribution computer includes: a storage means for storing content data formed of a free viewpoint motion image in which a viewing viewpoint can be changed; and a distributing means for distributing the content data to the user terminal. B) The user terminal includes the following means. The user terminal includes: a receiving means for receiving the content data; a display control means for displaying the created specific viewpoint motion image data on a display means; and an image changing means for providing a switching instruction to the distribution computer when a user provides the switching instruction about a viewpoint and viewpoint directions to the specific viewpoint motion image data displayed on the display means. C) The distribution computer includes a specific viewpoint image creating means for creating content data from a specific viewpoint based on the switching instruction for the content data when receiving the switching instruction. The distributing means distributes the created content data to the user terminal. D) The user terminal further includes the following means. The user terminal includes: a focused space determining means for determining a focused space in the created specific viewpoint motion image data; and a transmitting means for transmitting transitional history data of the focused space to the stereoscopic advertising frame determination computer. E) The stereoscopic advertising frame determination computer includes: a user-specific history data receiving means for receiving history of the focused space of the content data; and a stereoscopic advertising frame determining means for determining a stereoscopic advertising frame from the user-specific history data of a plurality of users.

In other words, changing processing of the free viewpoint motion image may be performed by the distribution server or the user terminal.

6. Third Embodiment

Positional information of an object located in a free viewpoint motion image is stored in some free viewpoint motion images. In such a case, it may be judged whether an object is located within a larger width of the distance L, and if the object is located within the width, a point may increase.

When positional information of the object is stored, providing an attribute of the object to the stereoscopic advertising frame determination computer allows an advertisement corresponding to the attribute of the object that belongs to the stereoscopic advertising frame. For example, if a certain stereoscopic advertising frame includes a kicker of soccer and "soccer shoes" are set as its object attribute, the stereoscopic advertising frame can be provided to a client who requests an advertisement in conjunction with soccer shoes.

7. Fourth Embodiment

In the above-described embodiments, the stereoscopic advertising frame is created on the assumption that the center of the projection screen from the current viewpoint is the focused region. However, it is not restrictive, and the whole projection screen may be the focused region.

If a part of the projection screen is the focused region in this manner, weights may be assigned such that a high point is provided to an individual region positioned in the center and a lower point is provided to a region farther from the center. The same certainly applies to the XY direction and also applies to the z direction (depth direction).

The focused region of the user is almost in the center of the projection screen in the present embodiment, but the focused region of the user may be more reliably obtained from a detection result by providing an eye tracking unit in the user terminal. Also in this case, the XY direction is clear, whereas the depth direction is unclear, so that it may be judged similarly to the above-described embodiments.

A conventional well-known configuration may be adopted as a configuration of the eye tracking unit.

8. Fifth Embodiment

The case where the focused region is determined in the user terminal is described in the above-described embodiments. However, change history of viewpoint conditions may be extracted in the user terminal and transmitted to the stereoscopic advertising frame determination computer to determine the focused region in the stereoscopic advertising frame determination computer. For example, time-series data of the change history may be data at switching timing as illustrated in FIG. 8 or viewpoint conditions at every time.

In this case, the invention is grasped as the following invention.

A stereoscopic advertising frame determination system includes a user terminal and a stereoscopic advertising frame determination computer. The user terminal is configured to receive content data formed of a free viewpoint motion image in which a viewing viewpoint can be changed from a distribution computer and display motion image data from a specific viewpoint on a display means. The user terminal is configured to display, when an operator applies viewpoint characteristic changing data that changes viewpoint characteristics to the displayed specific viewpoint motion image data, the specific viewpoint motion image data on the display means based on the viewpoint characteristic changing data. A) The user terminal further includes a focused space basic data creating means and a transmitting means. The focused space basic data creating means creates focused space determining basic data to determine a focused space in the specific viewpoint motion image on the basis of the specific viewpoint motion image data displayed on the display means. The transmitting means transmits transitional history of the focused space determining basic data to the stereoscopic advertising frame determination computer. B) The stereoscopic advertising frame determination computer includes a user-specific history data receiving means and a stereoscopic advertising frame determining means. The user-specific history data receiving means receives the transitional history of the content data. The stereoscopic advertising frame determining means determines a content-specific stereoscopic advertising frame obtained from the user-specific history data.

In the above-described embodiments, the distance L that determines the focused region is fixed depending on the content. However, history data of a plurality of users including a zoom ratio may be transmitted to the stereoscopic advertising frame determination computer, and the distance L may be changed dynamically in the stereoscopic advertising frame determination computer with reference to the history data. For example, if a focused region determined at a distance L1 by each user in the content of a certain soccer game has been transmitted at time tq and a zoom ratio at that time has been increased, the focused region may be recalculated with a shorter distance L1. In this way, the focused region in consideration of operation history of a plurality of users can be determined.

Figure 23:
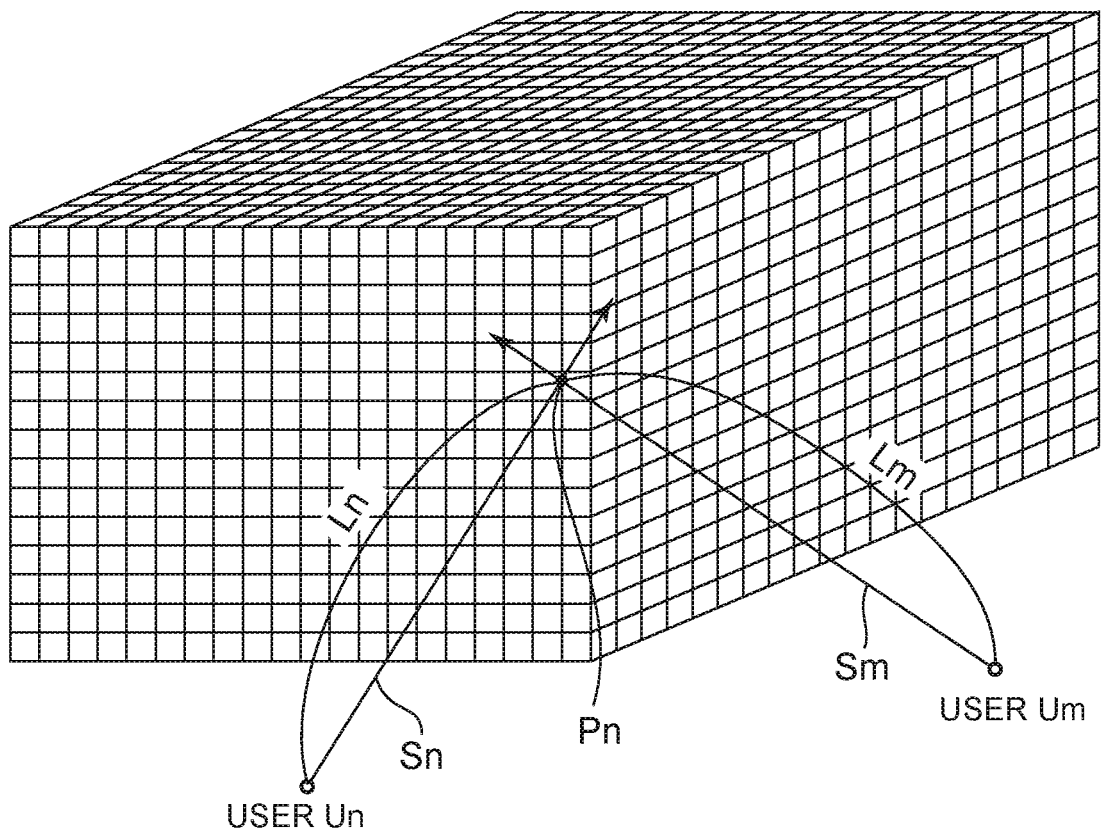
FIG. 23 is a diagram for explaining determination processing of a distance L in the stereoscopic advertising frame determination computer.

In the above-described embodiments, the distance L is determined for every content in the user terminal. The reason is that the distance L needs to be determined by any techniques for the depth direction of the focused region. However, time-series changes in viewpoint conditions may be transmitted from each user terminal to the stereoscopic advertising frame determination computer, and the stereoscopic advertising frame determination computer may determine the depth on the basis of the viewpoint conditions of a plurality of users. Specifically, history of the viewpoint conditions of each user at each time for a specific content is provided to the stereoscopic advertising frame determination computer. As illustrated in FIG. 23, with different line-of-sight directions Sm and Sn of a user Um and a user Un, respectively, at the same playback time, the stereoscopic advertising frame determination computer may determine distances to a position Pn where the different line-of-sight directions overlap each other as distances Lm, Ln, each in the depth direction. The distance L is also certainly changed according to the time in the content. Thus, the depth direction of the focused region can be more reliably determined. Note that the distances Lm, Ln, and a plurality of distances can be set in FIG. 23 because a zoom ratio may vary depending on users even in the same content, but the distances may be common for every content.

In this way, the focused region may be determined by not only the user terminal but may also be partially determined by the stereoscopic advertising frame determination computer.

Note that changing processing of a free viewpoint motion image and determination processing of a focused region can be performed by any computer.

9. Sixth Embodiment

In the present embodiment, if a stereoscopic advertising frame matches a current viewpoint condition, the set advertising frame is displayed. Specifically, if the viewpoint condition matches the inside of the stereoscopic advertising frame, an advertising frame is displayed under the viewpoint condition from any directions. In other words, it is a technique for displaying a two-dimensional advertising frame regardless of viewpoint directions. However, such a technique for displaying an advertisement also allows display in the following manner.

One technique is used to display an advertisement in a certain direction with respect to the advertising frame as in the reality and convert the advertisement into an image from a current viewpoint condition for display. This allows unusual display even for a two-dimensional advertisement. A stereoscopic (three-dimensional) advertisement also allows different advertisements depending on viewpoint directions.

The stereoscopic advertising frame may be further divided by line-of-sight directions and set as an advertising frame. For example, one stereoscopic advertising frame may be divided into two by 0-180 degrees and 180-360 degrees in the XY direction and each of them may be set as an advertising frame. The stereoscopic advertising frame can be divided into any number in the XYZ direction.

The case where a two-dimensional advertising frame is set as a stereoscopic advertising frame is described in the above-described embodiments, but an advertising frame having a three-dimensional shape may be set as the stereoscopic advertising frame.

10. Other Embodiments

The case where viewpoint conditions of a free viewpoint motion image can be freely switched is described in the present embodiment. However, viewpoint conditions may not be switched at first and the function of switching a viewpoint may be restricted such that the viewpoint can be switched by clicking a displayed advertisement. In this way, the viewpoint can be switched by looking at the advertisement, so that a rate of click on the advertisement can be further increased. Specifically, for example, the operation processing program 126p of the user terminal may execute processing that judges whether a switch permission flag that allows switching of viewpoint conditions by clicking an advertisement is set. Note that the switch permission flag turns on by clicking the advertisement.

A predetermined value is determined as the distance L1 according to an attribute of each content in the present embodiment, but the distance L1 may be stored as a parameter in content and then distributed.

A high point is provided to a region on which zoom processing is performed by assuming that the region is a focused region in the present embodiment, but such special processing is not necessary.

Coordinates of a viewpoint and viewpoint directions $\theta$, $\phi$ are stored in the present embodiment. However, in short, it is sufficient that the data can specify which direction a projection image is projected, so that any form can be used as long as the form can specify the direction directly or indirectly.

One recommended viewpoint is supplied to one free viewpoint motion image in the present embodiment, but a motion image from a plurality of viewpoints may be displayed on the screen and a combination of individual motion images formed by a user may be changed in the user terminal. A configuration of the free viewpoint motion image can also be switched by storing the data.

The processing of the user terminal is executed in the browser program in the above-described embodiments, but special hardware or software may be installed.

The user terminal may be a portable terminal instead of a personal computer.

The CPU is used to achieve the function illustrated in FIG. 2 and the software achieves the function in the above-described embodiments. However, a part or the whole of the function may be achieved by hardware such as a logic circuit.

Part of processing of the above-mentioned program may be performed by an operating system (OS).

The case where image-based rendering is adopted for a free viewpoint image is described in the present embodiment, but a technology for creating a free viewpoint image other than this data configuration is similarly applicable. For example, a technology disclosed in Japanese Patent Application Laid-Open No. 2014-056466 (US2014071131 (A1)) may be adopted.

Furthermore, a viewpoint of a free viewpoint image is arbitrary. For a soccer game, for example, a motion image can be displayed from not only a viewpoint outside a pitch but also a viewpoint from a player or a referee. For example, the motion image from such a viewpoint may be captured by a player or a referee with a camera or created from a motion image captured from the outside, and various techniques can be used.

The case where a free viewpoint motion image is projected on a two-dimensional plane is described in the present embodiment. The problem of how to set an advertising frame for an effective advertisement arises similarly in a system that three-dimensionally displays a free viewpoint motion image under changed viewpoint conditions. The present invention is similarly applicable to the three-dimensional motion image data. For example, when viewpoint conditions are switched for a holography picture in a three-dimensional smoke screen, a stereoscopic advertising frame can be similarly set on the three-dimensional smoke screen. Also in this case, the distance L can be determined similarly to that of the above-described embodiments.

Viewpoint conditions of a free viewpoint can be changed with the icons as illustrated in FIG. 11 in the present embodiment. A mouse pointer itself may be an operation icon instead of the icon display.

The present invention has been described as a preferred embodiment above. Each of terms is not used for limitation and is used for description. The terms can be modified within the scope of accompanying claims and without departing from the spirit and the scope of the invention.

A person skilled in the art would be able to understand that the technical matter described below is disclosed from the description of the present specification.

A stereoscopic advertising frame determination system, comprising:
 a user terminal configured to
  receive content data formed of a free viewpoint motion image in which a viewing viewpoint can be changed from a distribution computer and display motion image data from a specific viewpoint on a display means, and
  display, when an operator applies viewpoint characteristic changing data that changes viewpoint characteristics to the displayed specific viewpoint motion image data, the specific viewpoint motion image data on the display means on the basis of the viewpoint characteristic changing data; and
 a stereoscopic advertising frame determination computer, wherein
 A) the user terminal further includes
  a focused space determining means for determining a focused space in the specific viewpoint motion image on the basis of the specific viewpoint motion image data displayed on the display means, and
  a transmitting means for transmitting transitional history of the focused space to the stereoscopic advertising frame determination computer,
 B) the stereoscopic advertising frame determination computer includes
  a user-specific history data receiving means for receiving the transitional history of the content data as user-specific history data, and
  a stereoscopic advertising frame determining means for determining a content-specific stereoscopic advertising frame obtained from the user-specific history data, and
 the focused space determining means determines, as the focused space, a three-dimensional individual region that meets a two-dimensional display region specified by a designated viewpoint, a viewpoint direction, and provided depth specified data among three-dimensional individual regions formed by dividing a three-dimensional space defined in the free viewpoint motion image into a plurality of spaces.

Figure 24:
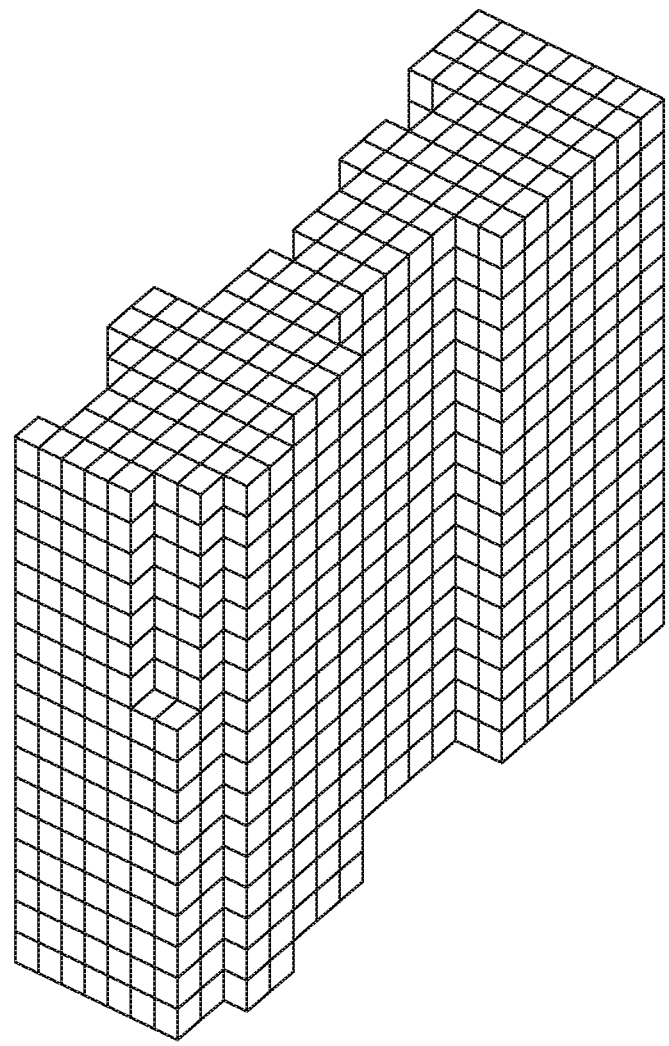
FIG. 24 is an example of a stereoscopic advertising frame.

A supplementary explanation of the stereoscopic advertising frame in the embodiment described above is provided. The stereoscopic advertising frame determined in Step S507 in FIG. 19 may be defined by its shape as it is or may be arranged in a shape close to a typical stereoscopic shape such as a spherical shape and a rectangular parallelepiped. For example, for the stereoscopic advertising frame having an irregular shape as illustrated in FIG. 24, an irregular portion may be shaved off as illustrated in FIG. 25 or a missing portion may be supplemented as illustrated in FIG. 26. Determination processing of such a stereoscopic advertising frame is executed by the stereoscopic advertising frame determination computer in the end.

Furthermore, matching judgment in the determination processing (Step S603 in FIG. 21) of the stereoscopic advertising frame may be performed as follows. If a target region defined by a viewpoint and a distance by a user is all included in the stereoscopic advertising frame, it is judged that the target region and the stereoscopic advertising frame are matching.

Also in a case where a target region defined by a viewpoint and a distance by a user not entirely but partially overlaps the stereoscopic advertising frame, it may be judged that the target region and the stereoscopic advertising frame are matching. In such a case where they are entirely or partially overlapping each other, the target region defined by the viewpoint and the distance by the user is defined as a two-dimensional region. However, it may be defined as a three-dimensional stereoscopic region.

In each of the embodiments described above, the case where an advertisement is displayed in the stereoscopic advertising frame is described. Such a region may be used for other than advertisement display. For example, when a short-distance runner is three-dimensionally displayed in track and field events, a superstar from 10 years ago can be displayed next to the short-distance runner as if they are running side by side. This can offer interesting contents to a viewer. In this way, the stereoscopic advertising frame may be used as a region in which various contents can be displayed. Note that not only two-dimensional data but also a three-dimensional character can be displayed in such a region.

The stereoscopic advertising frame can be further fragmented according to the number of distribution per unit time. For example, in a case of an Internet advertisement, the fixed number of advertisement views and an advertising frame are often purchased. Therefore, when the number of views per unit time is extremely high, it quickly reaches the estimated number of advertisement distribution, and the advertisement distribution is terminated. The stereoscopic advertising frame as in the present invention can reduce matching targets by changing the size. Therefore, concentrated distribution can be prevented by fragmenting the stereoscopic advertising frame as described above.

Figure 27:
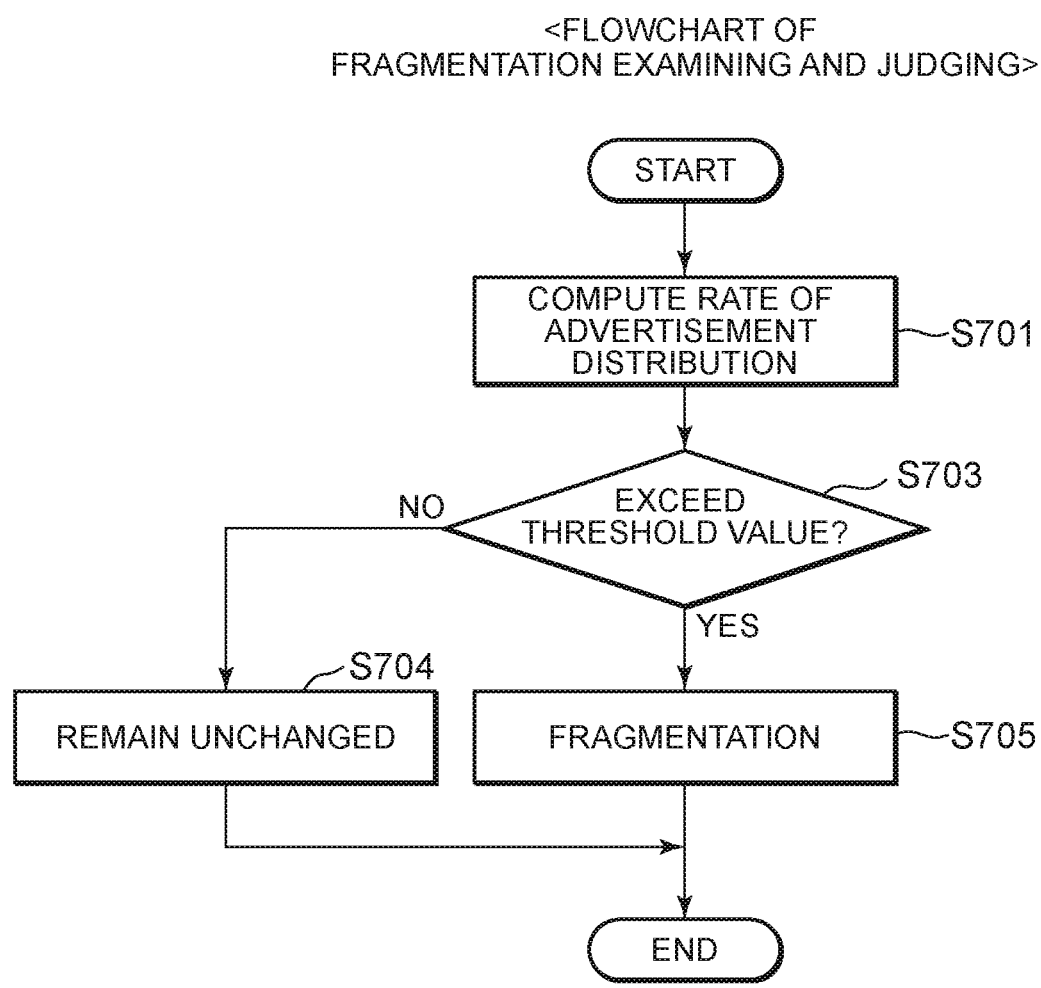
FIG. 27 illustrates a flowchart for fragmenting the stereoscopic advertising frame according to the number of distribution per unit time.

FIG. 27 illustrates an example of a flowchart for judgment in such a case.

The CPU 23 computes the number of advertisement distribution per unit time, which is also called "rate of advertisement distribution" (Step S701). The CPU 23 judges whether the computed rate of advertisement distribution exceeds a threshold value (Step S703). When it is judged that the computed rate of advertisement distribution exceeds the threshold value, the stereoscopic advertising frame is fragmented (Step S705).

Note that, in FIG. 27, whether the remaining number of advertisement distribution is less than or equal to a predetermined value may be judged before Step S703, and in this case, processing subsequent to Step S703 may be performed.

In the embodiment described above, it is described that a block size of each block is fixed. However, as a zoom degree changes, a block size in a focused space and a relative size in a display region vary. Therefore, it may be adjusted such that a size difference according to a zoom degree is absorbed. Specifically, it may be adjusted as follows. The CPU 23 counts a total number of displayed blocks according to a zoom degree in a user terminal. The CPU 23 then adjusts a block coefficient to satisfy the following formula, the number of displayed blocks×one block coefficient=a fixed value. Accordingly, the number of displayed blocks is ½ due to a zoom in, so that a block coefficient doubles.

In such a manner, the size difference of the blocks according to the zoom degree can be absorbed.

The determination processing of the stereoscopic advertising frame may be performed as follows.

In a case where there are a plurality of stereoscopic advertising frames, another advertisement is assigned to each of the stereoscopic advertising frames, and some of the stereoscopic advertising frames match the target region defined by the viewpoint and the distance by the user, it is conceivable that it cannot be judged which stereoscopic advertising frame needs to be displayed. When they conflict as described above, a degree of priority may be determined in advance. For example, in a case where a first stereoscopic advertising frame completely covers a second stereoscopic advertising frame, that is to say, one nests inside the other, a higher degree of matching with a target region defined by a viewpoint and a distance by a user may be prioritized. If the degree of matching is not given the highest priority and the target region defined by the viewpoint and the distance by the user is zoomed in, then a stereoscopic advertising frame inside (the first stereoscopic advertising frame in the description above) may be prioritized. If the target region is zoomed out, a stereoscopic advertising frame outside (the second stereoscopic advertising frame in the description above) may be prioritized.

As described above, an advertisement displayed to the user may be switched according to a current zoom degree even if there is only one stereoscopic advertising frame as well as there are the plurality of stereoscopic advertising frames. For example, when a user watches a soccer game, puts a focus on a specific individual, and zooms in, shoes or the like may be advertised. When a user watches the whole game instead of a specific individual, a soft drink or the like that matches the whole display may be advertised. In this case, for example, an identifier of an advertisement according to an extent of zooming is stored in the stereoscopic advertising frame, and an identifier of an advertisement according to a current zoom degree may be provided from a user terminal to an advertisement distribution control server (not shown).

Figure 28:
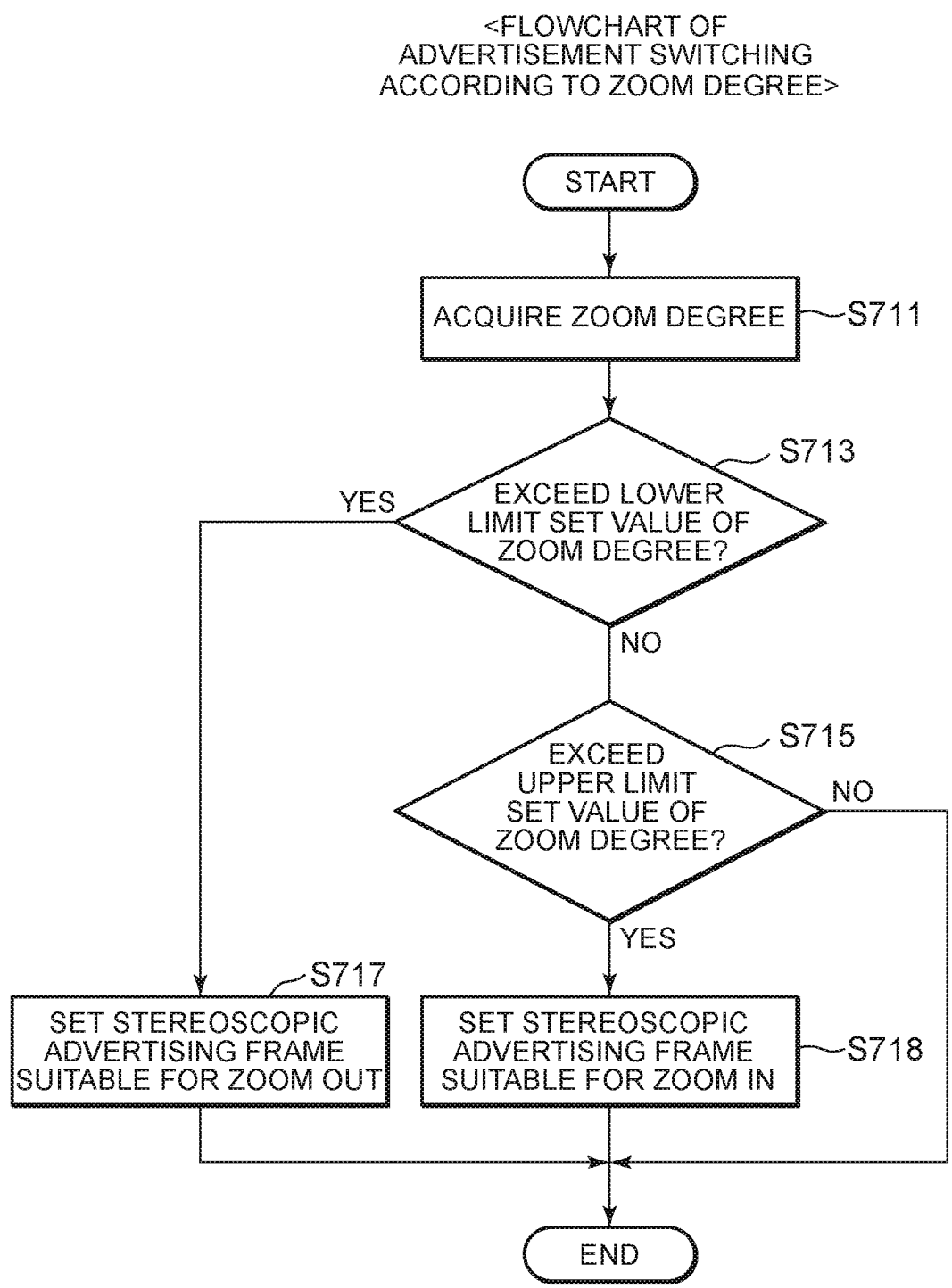
FIG. 28 illustrates a flowchart for switching a displayed advertisement according to a current zoom degree.

FIG. 28 illustrates a flowchart of such processing. The CPU 23 acquires a current zoom degree from a user terminal (Step S711). The current zoom degree can be acquired by requesting distribution from the user terminal.

The CPU 23 judges whether the current zoom degree exceeds a lower limit set value of the zoom degree (Step S713). If the current zoom degree exceeds the lower limit set value, the stereoscopic advertising frame is set as an advertising frame suitable for a zoom out (Step S717). In Step S713, if the current zoom degree does not exceed the lower limit set value, it is judged whether the current zoom degree exceeds an upper limit set value of the zoom degree (Step S715). If the current zoom degree exceeds the upper limit set value, the stereoscopic advertising frame is set as an advertising frame suitable for a zoom in (Step S718).

In this way, an advertisement suitable for a current zoom degree can be distributed to each user terminal.

As described above, for the use of a stereoscopic advertising frame, an advertising frame according to a region can be set. Therefore, a stereoscopic advertising frame having high advertising efficiency can be achieved. This is because the stereoscopic advertising frame can be used as an advertising frame that more matches interests of a viewer by fragmenting the stereoscopic advertising frame.

In the embodiment described above, the case where the stereoscopic advertising frame determination computer processes all the processing is described. However, focused space basic data may be generated by the user terminal.

The invention claimed is:

1. A stereoscopic advertising frame determination system, comprising:
   a user terminal configured to:
      receive content data formed of a free viewpoint motion image in which a viewing viewpoint can be changed from a distribution computer and display motion image data from a specific viewpoint on a display means, and
      display, when an operator applies viewpoint characteristic changing data that changes viewpoint characteristics to the displayed specific viewpoint motion image data, the specific viewpoint motion image data on the display means on the basis of the viewpoint characteristic changing data; and
   a stereoscopic advertising frame determination computer, wherein
   A) the user terminal further includes:
      a focused space determining means for determining a focused space in the specific viewpoint motion image on the basis of the specific viewpoint motion image data displayed on the display means, and
      a transmitting means for transmitting transitional history of the focused space to the stereoscopic advertising frame determination computer,
   B) the stereoscopic advertising frame determination computer includes
      a user-specific history data receiving means for receiving the transitional history of the content data as user-specific history data, and a stereoscopic advertising frame determining means for determining a content-specific stereoscopic advertising frame obtained from the user-specific history data, C) the focused space determining means determines, as the focused space, a three-dimensional individual region that meets a two-dimensional display region specified by a designated viewpoint, a viewpoint direction, and provided depth specified data among three-dimensional individual regions formed by dividing a three-dimensional space defined in the free viewpoint motion image into a plurality of spaces, and D) the stereoscopic advertising frame determining means determines a three-dimensional area based on a set of three-dimensional individual region given from a plurality of user terminals as the stereoscopic advertisement frame.

2. The stereoscopic advertising frame determination system according to claim 1, wherein the stereoscopic advertising frame determining means determines an AND-operated set or OR-operated set of three-dimensional individual regions given from a plurality of user terminals as the stereoscopic advertisement frame.

3. The stereoscopic advertising frame determination system according to claim 1, wherein the free viewpoint motion image is played back from specified viewpoint and the viewpoint directions from start of playback until end of the playback.

4. The stereoscopic advertising frame determination system according to claim 2, wherein the three-dimensional advertisement frame is a rectangular parallelepiped formed by removing or adding a part from the AND operation set or OR operation set of the three-dimensional individual region.

5. The stereoscopic advertising frame determination system according to claim 2, wherein the stereoscopic advertising frame determining means, when the areas defined by the AND operation set or the OR operation set are not continuous, combines the areas to form the stereoscopic advertisement frame.

6. A stereoscopic advertising frame determination system, comprising:
a user terminal configured to:
receive content data formed of a free viewpoint motion image in which a viewing viewpoint can be changed from a distribution computer and display motion image data from a specific viewpoint on a display means, and
display, when an operator applies viewpoint characteristic changing data that changes viewpoint characteristics to the displayed specific viewpoint motion image data, the specific viewpoint motion image data on the display means on the basis of the viewpoint characteristic changing data; and
a stereoscopic advertising frame determination computer, wherein
A) the user terminal further includes:
a focused space basic data creating means for creating focused space basic data to determine a focused space in the specific viewpoint motion image on the basis of the specific viewpoint motion image data displayed on the display means, and
a transmitting means for transmitting transitional history of the focused space basic data to the stereoscopic advertising frame determination computer,
B) the stereoscopic advertising frame determination computer includes a user-specific history data receiving means for receiving the transitional history of the content data as user-specific history data, and
a stereoscopic advertising frame determining means for determining a content-specific stereoscopic advertising frame obtained from the user-specific history data, and C) the focused space basic data creating means determines, as the focused space, a three-dimensional individual region that meets a two-dimensional display region specified by a designated viewpoint, a viewpoint direction, and provided depth specified data among three-dimensional individual regions formed by dividing a three-dimensional space defined in the free viewpoint motion image into a plurality of spaces, and creates the focused space basic data, and D) the stereoscopic advertising frame determining means determines a three-dimensional area based on a set of three-dimensional individual region given from a plurality of user terminals as the stereoscopic advertisement frame.

7. The stereoscopic advertising frame determination system according to claim 6, wherein the stereoscopic advertising frame determining means determines an AND-operated set or OR-operated set of three-dimensional individual regions given from a plurality of user terminals as the stereoscopic advertisement frame.

8. The stereoscopic advertising frame determination system according to claim 6, wherein the free viewpoint motion image is played back from specified viewpoint and the viewpoint directions from start of playback until end of the playback.

9. The stereoscopic advertising frame determination system according to claim 7, wherein the stereoscopic advertisement frame is a rectangular parallelepiped formed by removing or adding a part from the AND operation set or OR operation set of the three-dimensional individual region.

10. The stereoscopic advertising frame determination system according to claim 7, wherein the stereoscopic advertising frame determining means, when the areas defined by the AND operation set or the OR operation set are not continuous, combines the areas to form the stereoscopic advertisement frame.

11. A method for determining a stereoscopic advertising frame,
a distribution computer, a user terminal, and a stereoscopic advertising frame determination computer being connected to one another,
the user terminal being configured to:
receive content data formed of a free viewpoint motion image in which a viewing viewpoint can be changed from the distribution computer and display motion image data from a specific viewpoint on the user terminal, and
display, when an operator applies viewpoint characteristic changing data that changes viewpoint characteristics to the displayed specific viewpoint motion image data, the specific viewpoint motion image data based on the viewpoint characteristic changing data, wherein
A) the user terminal includes:
a focused space determining step of determining a focused space in the specific viewpoint motion image on the basis of the displayed specific viewpoint motion image data as user-specific history data, and a step of transmitting transitional history of the focused space to the stereoscopic advertising frame determination computer, and B) the stereoscopic advertising frame determination computer is configured to determine a content-specific stereoscopic advertising frame obtained from the user-specific history data when receiving the transitional history of the content data, and C) the user terminal computer determines, as the focused space, a three-dimensional individual region that meets a two-dimensional display region specified by a designated viewpoint, a viewpoint direction, and provided depth specified data among three-dimensional individual regions formed by dividing a three-dimensional space defined in the free viewpoint motion image into a plurality of spaces in the focused space determining step, and D) the stereoscopic advertising frame determination computer determines a three-dimensional area based on a set of three-dimensional individual region given from a plurality of user terminals as the stereoscopic advertisement frame.

12. The stereoscopic advertising frame determination method according to claim 11, wherein the stereoscopic advertisement frame is determined based on an AND-operated set or OR-operated set of three-dimensional individual regions given from a plurality of user terminals.

13. The stereoscopic advertising frame determination method according to claim 11, wherein the free viewpoint motion image is played back from specified viewpoint and the viewpoint directions from start of playback until end of the playback.

14. The stereoscopic advertising frame determination method according to claim 12, wherein the stereoscopic advertisement frame is a rectangular parallelepiped formed by removing or adding a part from the AND operation set or OR operation set of the three-dimensional individual region.

15. The stereoscopic advertising frame determination method according to claim 12, wherein the stereoscopic advertising frame determining means, when the areas defined by the AND operation set or the OR operation set are not continuous, the areas is combined to form the stereoscopic advertisement frame.

* * * * *